United States Patent
Tadano et al.

(10) Patent No.: US 7,042,817 B2
(45) Date of Patent: *May 9, 2006

(54) ABERRATION DETECTION DEVICE, ABERRATION DETECTION METHOD, AND OPTICAL PICK-UP DEVICE FOR CONTROLLING SPHERICAL ABERRATION

(75) Inventors: Hiroyuki Tadano, Kitakatsuragi-gun (JP); Ikuo Nakano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 819 days.

This patent is subject to a terminal disclaimer.

(21) Appl. No.: 09/994,024

(22) Filed: Nov. 14, 2001

(65) Prior Publication Data

US 2002/0057359 A1 May 16, 2002

(30) Foreign Application Priority Data

Nov. 15, 2000 (JP) ............................. 2000-348679

(51) Int. Cl.
*G11B 7/00* (2006.01)
*G11B 7/135* (2006.01)
*G02B 27/40* (2006.01)

(52) U.S. Cl. ................................ 369/44.23; 360/112.1; 250/201.5

(58) Field of Classification Search ........... 369/444.23, 369/112.1, 44.23; 250/201.5; G11B 7/00, G11B 7/135; G02B 27/64, 27/40, 27/06
See application file for complete search history.

(56) References Cited

U.S. PATENT DOCUMENTS

| | | | |
|---|---|---|---|
| 5,708,638 A * | 1/1998 | Braat et al. ............... | 369/44.29 |
| 6,229,600 B1 * | 5/2001 | Martynov ................... | 356/123 |
| 6,339,562 B1 * | 1/2002 | Sakai ....................... | 369/44.23 |
| 6,498,330 B1 * | 12/2002 | Yoshida .................... | 250/201.5 |
| 6,730,896 B1 * | 5/2004 | Yamada ..................... | 250/201.5 |
| 6,754,146 B1 * | 6/2004 | Ma et al. .................. | 369/44.41 |
| 6,822,209 B1 * | 11/2004 | Tadano et al. ............ | 250/201.5 |
| 6,865,144 B1 * | 3/2005 | Yanagisawa et al. ..... | 369/44.32 |

FOREIGN PATENT DOCUMENTS

| | | |
|---|---|---|
| JP | 10-500526 | 1/1998 |
| JP | 10-208280 | 8/1998 |
| JP | 2000-155979 | 6/2000 |
| JP | 2000-171346 | 6/2000 |
| JP | 2000-182254 | 6/2000 |
| JP | 2001-229566 | 8/2001 |
| WO | WO-WO 96/28816 | 9/1996 |
| WO | WO 99/18466 | * 4/1999 |

* cited by examiner

*Primary Examiner*—A M Psitos
(74) *Attorney, Agent, or Firm*—Peter J. Manus; David G. Conlin; Edwards Angell Palmer & Dodge LLP

(57) ABSTRACT

An aberration detection device which can detect a spherical aberration sensitively by separating a light beam appropriately so as to enlarge a difference in the positions where the respective separated light beams have the minimum spot diameters, and thus to enlarge a deviation amount of the focus positions of the separated light beams, is provided. A hologram for separating a light beam reflected from an optical disk and passing through a dual element objective lens into a first light beam and a second light beam, and a detection device for receiving the first and the second light beams and detecting the deviation of focus positions of the first and the second light beams, are equipped. The light beam directed to the hologram is separated into the first light beam and the second light beam, by a first region and a second region of the hologram which are obtained by being separated at a boundary drawn at an extreme value of a curve representing a wave front when the light beam has a minimum beam diameter on an information recording layer of the optical disk.

19 Claims, 14 Drawing Sheets

CHANGE IN THICKNESS OF COVER GLASS (mm)

CHANGE IN THICKNESS OF COVER GLASS (mm)

CHANGE IN THICKNESS OF COVER GLASS (mm)

ABERRATION DETECTION DEVICE, ABERRATION DETECTION METHOD, AND OPTICAL PICK-UP DEVICE FOR CONTROLLING SPHERICAL ABERRATION

FIELD OF THE INVENTION

The present invention relates to an aberration detection device for detecting an aberration caused in a focusing optical system, and an optical pick-up device provided with the aberration detection device.

BACKGROUND OF THE INVENTION

Recently, in accordance with the increase in the amount of information, optical disks have been required to have a higher recording density. Optical disks with a higher recording density have been realized by increasing a linear recording density in an information recording layer of an optical disk or by providing tracks in a narrower pitch. To cope with realizing such optical disks with a higher recording density, it is necessary to decrease a beam diameter of a light beam focused onto the information recording layer of the optical disk.

It can be considered that a beam diameter of a light beam can be decreased by increasing a numerical aperture (NA) of an objective lens to which the light beam is directed, which serves as a focusing optical system in an optical pick-up device for recording/reproducing information on/from an optical disk, and by shortening a wave length of the light beam.

The shortening of the wave length of the light beam is considered as feasible by changing a light source from a red semiconductor laser to a blue-purple semiconductor laser which has been being put on the road to commercialization in a full scale.

On the other hand, as for an objective lens having a high NA, a technique in which a hemispherical lens is combined to an objective lens, and the objective lens is constituted by the two lenses (the two-group lens), so as to realize an objective lens having a high NA, has been proposed.

Meanwhile, generally in an optical disk, an information recording layer is covered with cover glass so as to be protected from dust and flaws. Therefore, a light beam passing through an objective lens in an optical pick-up device passes through the cover glass, and is focused onto the information recording layer located under the cover glass and forms a focus.

When the light beam passes through the cover glass, a spherical aberration SA is caused. The spherical aberration SA can be expressed as:

$$SA \propto d \cdot NA^4, \quad (1)$$

which means that the spherical aberration is proportional to a cover glass thickness d and the fourth power of the NA of the objective lens. Generally, the objective lens is designed so as to make up for the spherical aberration, so the spherical aberration of the light beam passing through the objective lens and the cover glass is sufficiently small.

However, if the thickness of the cover glass deviates from a predetermined value, the spherical aberration is caused in the light beam focused onto the information recording layer. Thus, the beam diameter is increased, causing a problem that information cannot be read/written correctly.

Besides, it is clear from the foregoing expression (1) that a spherical aberration error $\Delta SA$ increases with the increase of a thickness error $\Delta d$ of the cover glass, resulting in that information cannot be read/written correctly.

Meanwhile, in order to have a higher information recording density in a direction of the thickness of the optical disk, a multi-layer optical disk formed by laminating information recording layers has been provided. For example, a DVD (Digital Versatile Disc) having two information recording layers has already been commercialized as a multi-layer optical disk. In an optical pick-up device for recording/reproducing information on/from such a multi-layer optical disk, it is necessary to focus a light beam so as to be sufficiently small, onto each of the information recording layers in the optical disk.

In an optical disk having multiple information recording layers as mentioned above, thicknesses from a surface of the optical disk (a surface of cover glass) to the respective information recording layers are different. Thus, spherical aberration caused when a light beam passes through the cover glass of the optical disk differs for each information recording layer. In this case, for example, the difference (error) $\Delta SA$ of the spherical aberrations caused in adjacently laminated information recording layers is proportional to a distance t between the adjacently laminated information recording layers (corresponding to the thickness d), which is obtained from the expression (1).

In the DVD having two information recording layers, the NA of the objective lens in the optical pick-up device is small, around 0.6. Consequently, it is clear from the foregoing expression (1) that, even if the thickness error $\Delta d$ of the cover glass increases in some degree, the increase has little effect on the spherical aberration difference $\Delta SA$.

Therefore, in a DVD device using a conventional optical pick-up device having a NA of around 0.6, the spherical aberration difference $\Delta SA$ caused by the thickness error $\Delta d$ of the cover glass of the DVD is small, and thus the light beam can be focused onto each information recording layer so as to be sufficiently small.

However, even if the thickness error $\Delta d$ of the cover glass is identical, a greater spherical aberration is caused with the increase of the NA. For example, when NA=0.85, an approximately four-fold spherical aberration is caused compared with the case where NA=0.6. Therefore, it is clear from the foregoing expression (1) that, the higher the NA becomes, as NA=0.85, the greater the spherical aberration is caused by the thickness error $\Delta d$ of the cover glass.

Likewise, in the multi-layer optical disk, even if the distance t between the adjacently laminated information recording layers is identical, a greater spherical aberration difference $\Delta SA$ is caused with the increase of the NA of the objective lens in the optical pick-up device. For example, when NA=0.85, an approximately four-fold spherical aberration difference is caused compared with the case where NA=0.6. Therefore, it is clear from the foregoing expression (1) that, the higher the NA becomes, as NA=0.85, the greater the difference of the spherical aberrations of the respective information recording layers becomes.

Therefore, in an objective lens having a high NA, the effect by the spherical aberration error is not negligible, and it results in the deterioration of information reading accuracy. Hence, in order to realize a higher recording density using the objective lens having a high NA, it is necessary to correct the spherical aberration.

As techniques for correcting a spherical aberration, techniques disclosed in Japanese Unexamined Patent Publications No. 2000-155979 (Tokukai 2000-155979, published on Jun. 6, 2000: reference 1), No. 2000-182254 (Tokukai 2000-182254, published on Jun. 30, 2000: reference 2), No.

2000-171346 (Tokukai 2000-171346, published on Jun. 23, 2000, U.S. patent application Ser. No. 09/456,414, applied on Dec. 8, 1999: reference 3), etc. can be considered.

The reference 1 discloses a technique that, in a light beam on a return path, which is reflected from an optical disk and to be focused, only a part of the light beam which passes through a region between two concentric circles having different radii centered on a light axis of the light beam (a region in a half-ring shape) is focused so as to detect a spherical aberration, and the spherical aberration is corrected in accordance with the detected result.

The reference 2 discloses a technique that, a light beam on a return path, which is reflected from an optical disk and to be focused, is separated by a hologram device into a light beam close to a light axis of the foregoing light beam and a light beam outside the light beam close to the light axis of the foregoing light beam, and the two light beams are focused so as to detect a spherical aberration, and the spherical aberration is corrected in accordance with the detected result.

The reference 3 discloses a technique for detecting a spherical aberration when a light beam is focused onto an information recording layer of an optical disk, by utilizing the difference in a focus position of a part of the light beam close to a light axis and a focus position of a part of the light beam outside the part of the light beam close to the light axis, which results from the spherical aberration, and correcting the spherical aberration in accordance with the detected result.

However, the foregoing references 1 through 3 have the following problems.

In the reference 1, the light beam passing through the half-ring shaped region in the region between the two concentric circles having different radii centered on the light axis of the light beam, is utilized as a light beam for detecting the spherical aberration. The half-ring shaped region is a region including an extreme value of a curve representing a wave front of the light beam, and the light beam passing through the region is focused onto a focus position of a focused light beam in an ideal wave front having no spherical aberration. Therefore, the technique disclosed in the reference 1 cannot be adopted to a method for detecting a spherical aberration error signal by utilizing a focus position of a light beam.

In the references 2 and 3, the spherical aberration is detected by detecting a deviation in the focus positions of the separated light beams. Thus, unless the light beam is appropriately separated, the difference between the positions where the separated light beams have the minimum spot diameters, respectively, is reduced, and thus the amount of the deviation in the focus positions of the separated light beams is reduced, failing to detect the spherical aberration sensitively.

SUMMARY OF THE INVENTION

The present invention is made so as to solve the foregoing problems, and its object is to provide an aberration detection device, an aberration detection method, and an optical pick-up device, which can detect a spherical aberration sensitively by separating a light beam appropriately so as to enlarge a difference in the positions where the respective separated light beams have the minimum spot diameters, and thus to enlarge a deviation amount of the focus positions of the separated light beams.

In order to attain the foregoing object, an aberration detection device of the present invention includes:

light beam separation means for separating a light beam passing through a focusing optical system into a first light beam which includes a light axis of the light beam and a second light beam which does not include the light axis of the light beam, at a boundary drawn at an extreme value of a curve representing a wave front when the light beam has a minimum beam diameter on an information recording layer of an optical recording medium; and spherical aberration detection means for detecting a spherical aberration of the focusing optical system, in accordance with at least one of focus positions of the two light beams separated by the light beam separation means.

In a case where the wave front when the light beam has the minimum beam diameter on the information recording layer of the optical recording medium is represented by a curve, a tangent at the extreme value of the curve is virtually parallel to a tangent of a curve representing an ideal wave front having no spherical aberration. This means that a converging point (a focus) where the light beam passing through the extreme value of the curve representing the wave front when the light beam forms the best image point on the information recording layer of the optical recording medium converges virtually coincides with the best image point. Here, the best image point is an image point where the light beam has the minimum diameter.

Therefore, as in the foregoing structure, by separating the light beam passing through the focusing optical system by the light beam separation means into the first light beam which includes the light axis of the foregoing light beam and the second light beam which does not include the light axis of the foregoing light beam, at the boundary drawn at the extreme value of the curve representing the wave front when the light beam has the minimum beam diameter on the information recording layer of the optical recording medium, none of the focuses of the separated two light beams coincides with the best image point.

With this structure, the focus positions of the separated two light beams and the best image point can be clearly distinguished, and thus the distances from the focus positions of the separated two light beams and the best image point, that is, the focus position deviation amounts of the respective light beams, are specified. Consequently, by using the focus position deviation amounts obtained in such a manner, the spherical aberration of the focusing optical system can be detected sensitively.

Besides, since none of the focus positions of the separated two light beams coincides with the best image point, the spherical aberration of the focusing optical system can be detected in accordance with either of the focus positions of the two light beams.

In order to attain the foregoing object, another aberration detection device of the present invention includes:

light beam separation means for separating a light beam passing through a focusing optical system into a first light beam which includes a light axis of the light beam and a second light beam which does not include the light axis of the light beam; and aberration detection means for detecting a spherical aberration of the focusing optical system, in accordance with at least one of focus positions of the first light beam and the second light beam separated by the light beam separation means, and the aberration detection means includes:

a first focus error detection section for detecting a focus position deviation of the first light beam from the first light beam, and outputting a first error signal; and a second focus error detection section for detecting a focus position deviation of the second light beam from the second light beam, and outputting a second error signal, wherein the aberration detection means obtains a spherical aberration error signal SAES showing an amount of the spherical aberration of the focusing optical system, from an equation:

$$SAES=F1-FES \times k1 \ (k1: \text{a coefficient}),$$

where F1 is the first error signal, F2 is the second error signal, and FES, which is a focus error signal showing an amount of a focus error of the focusing optical system, is F1+F2, and the aberration detection means detects the spherical aberration from the spherical aberration error signal SAES.

In order to attain the foregoing object, another aberration detection device of the present invention includes:

light beam separation means for separating a light beam passing through a focusing optical system into a first light beam which includes a light axis of the light beam and a second light beam which does not include the light axis of the light beam; and aberration detection means for detecting a spherical aberration of the focusing optical system, in accordance with at least one of focus positions of the first light beam and the second light beam separated by the light beam separation means, and the aberration detection means includes:

a first focus error detection section for detecting a focus position deviation of the first light beam from the first light beam, and outputting a first error signal; and a second focus error detection section for detecting a focus position deviation of the second light beam from the second light beam, and outputting a second error signal, wherein the aberration detection means obtains a spherical aberration error signal SAES showing an amount of the spherical aberration of the focusing optical system, from an equation:

$$SAES=F2-FES \times k2 \ (k2: \text{a coefficient}),$$

where F1 is the first error signal, F2 is the second error signal, and FES, which is a focus error signal showing an amount of a focus error of the focusing optical system, is F1+F2, and the aberration detection means detects the spherical aberration from the spherical aberration error signal SAES.

When a spherical aberration is caused in the focusing optical system, the focus position of the first light beam and the focus position of the second light beam both change. Thus, the first error signal F1 obtained by detecting the focus position deviation of the first light beam and the second error signal F2 obtained by detecting the focus position deviation of the second light beam are both changed by the spherical aberration. Besides, the first error signal F1 and the second error signal F2 are subjected to positive and negative effects by the spherical aberration, respectively.

Therefore, by using both of the first error signal F1 and the second error signal F2 so as to obtain the focus error signal FES of the focusing optical system as in the foregoing structure, a signal in which the effect of the spherical aberration is restrained as much as possible can be obtained.

In this manner, the spherical aberration can be accurately detected by obtaining the spherical aberration error signal SAES using the focus error signal FES in which the effect of the spherical aberration is restrained as much as possible.

In order to attain the foregoing object, an aberration detection method of the present invention is a method for separating a light beam passing through a focusing optical system into a light beam which includes a light axis of the light beam and a light beam which does not include the light axis of the light beam, at a boundary drawn at an extreme value of a curve representing a wave front when the light beam has a minimum beam diameter on an information recording layer of an optical recording medium; and for detecting a spherical aberration of the focusing optical system, in accordance with at least one of focus positions of the separated two light beams.

According to the foregoing structure, by separating the light beam passing through the focusing optical system into the light beam which includes the light axis of the original light beam and the light beam which does not include the light axis of the original light beam, at the boundary drawn at the extreme value of the curve representing the wave front when the original light beam has the minimum beam diameter on the information recording layer of the optical recording medium, none of the focuses of the separated two light beams coincides with the best image point.

With this structure, the focus positions of the separated two light beams and the best image point can be clearly distinguished, and thus the distances from the focus positions of the separated two light beams and the best image point, that is, the focus position deviation amounts of the respective light beams, are specified. Consequently, by using the focus position deviation amounts obtained in such a manner, the spherical aberration of the focusing optical system can be detected sensitively.

In order to attain the foregoing object, an optical pick-up device of the present invention includes:

a light source;

a focusing optical system for focusing a light beam emitted from the light source onto an optical recording medium;

light beam separation means for separating a light beam reflected from the optical recording medium and passing through the focusing optical system, into a first light beam which includes a light axis of the light beam and a second light beam which does not include the light axis of the light beam, at a boundary drawn at an extreme value of a curve representing a wave front when the light beam has a minimum beam diameter on an information recording layer of an optical recording medium;

spherical aberration detection means for detecting a spherical aberration of the focusing optical system, in accordance with at least one of focus positions of the two light beams separated by the light beam separation means; and spherical aberration correction means for correcting the spherical aberration detected by the spherical aberration detection means.

In a case where the wave front when the light beam has the minimum beam diameter on the information recording layer of the optical recording medium is represented by a curve, a tangent at the extreme value of the curve is virtually parallel to a tangent of a curve representing an ideal wave front having no spherical aberration. This means that a converging point (a focus) where the light beam passing through the extreme value of the curve representing the wave front when the light beam forms the best image point on the information recording layer of the optical recording medium converges virtually coincides with the best image point.

Therefore, as in the foregoing structure, by separating the light beam reflected from the optical recording medium and passing through the focusing optical system by the light beam separation means into the first light beam which includes the light axis of the light beam and the second light beam which does not include the light axis of the light beam, at the boundary drawn at the extreme value of the curve representing the wave front when the light beam has the minimum beam diameter on the information recording layer of the optical recording medium, none of the focuses of the separated two light beams coincides with the best image point.

With this structure, the focus positions of the separated two light beams and the best image point can be clearly distinguished, and thus the distances from the focus positions of the separated two light beams and the best image point, that is, the focus position deviation amounts of the respective light beams, are specified. Consequently, the spherical aberration of the focusing optical system can be detected sensitively.

Therefore, by correcting the focus position deviation in the focusing optical system in accordance with the accurately detected focus position deviation amounts, the spherical aberration of the focusing optical system can be corrected with high accuracy.

In order to attain the foregoing object, another optical pick-up device of the present invention includes:

a light source;

a focusing optical system for focusing a light beam emitted from the light source onto an optical recording medium;

light beam separation means for separating a light beam reflected from the optical recording medium and passing through the focusing optical system, into a first light beam which includes a light axis of the light beam and a second light beam which does not include the light axis of the light beam;

focus position deviation amount detection means for detecting a deviation amount of at least one of focus positions of the first light beam and the second light beam separated by the light beam separation means; and correction means for correcting a spherical aberration of the focusing optical system in accordance with the deviation amount of the focus position detected by the focus position deviation amount detection means, and the focus position deviation amount detection means includes:

a first focus error detection section for detecting a focus position deviation of the first light beam from the first light beam, and outputting a first error signal; and a second focus error detection section for detecting a focus position deviation of the second light beam from the second light beam, and outputting a second error signal, wherein the focus position deviation amount detection means obtains a spherical aberration error signal SAES showing an amount of the spherical aberration of the focusing optical system, from an equation:

$$SAES = F1 - FES \times k1 \ (k1: \text{a coefficient}),$$

where F1 is the first error signal, F2 is the second error signal, and FES, which is a focus error signal showing an amount of a focus error of the focusing optical system, is F1+F2, and the correction means corrects the spherical aberration in accordance with the spherical aberration error signal SAES obtained by the focus position deviation amount detection means.

In order to attain the foregoing object, another optical pick-up device of the present invention includes:

a light source;

a focusing optical system for focusing a light beam emitted from the light source onto an optical recording medium;

light beam separation means for separating a light beam reflected from the optical recording medium and passing through the focusing optical system, into a first light beam which includes a light axis of the light beam and a second light beam which does not include the light axis of the light beam;

focus position deviation amount detection means for detecting a deviation amount of at least one of focus positions of the first light beam and the second light beam separated by the light beam separation means; and correction means for correcting a spherical aberration of the focusing optical system in accordance with the deviation amount of the focus position detected by the focus position deviation amount detection means, and the focus position deviation amount detection means includes:

a first focus error detection section for detecting a focus position deviation of the first light beam from the first light beam, and outputting a first error signal; and a second focus error detection section for detecting a focus position deviation of the second light beam from the second light beam, and outputting a second error signal, wherein the focus position deviation amount detection means obtains a spherical aberration error signal SAES showing an amount of the spherical aberration of the focusing optical system, from an equation:

$$SAES = F2 - FES \times k2 \ (k2: \text{a coefficient}),$$

where F1 is the first error signal, F2 is the second error signal, and FES, which is a focus error signal showing an amount of a focus error of the focusing optical system, is F1+F2, and the correction means corrects the spherical aberration in accordance with the spherical aberration error signal SAES obtained by the focus position deviation amount detection means.

When a spherical aberration is caused in the focusing optical system, the focus position of the first light beam and the focus position of the second light beam both change. Thus, the first error signal F1 obtained by detecting the focus position deviation of the first light beam and the second error signal F2 obtained by detecting the focus position deviation of the second light beam are both changed by the spherical aberration. Besides, the first error signal F1 and the second error signal F2 are subjected to positive and negative effects by the spherical aberration, respectively.

Therefore, by using both of the first error signal F1 and the second error signal F2 so as to obtain the focus error signal FES of the focusing optical system as in the foregoing structure, a signal in which the effect of the spherical aberration is restrained as much as possible can be obtained.

In this manner, the spherical aberration can be accurately detected by obtaining the spherical aberration error signal SAES using the focus error signal FES in which the effect of the spherical aberration is restrained as much as possible, and thus the spherical aberration can be accurately corrected.

For a fuller understanding of the nature and advantages of the invention, reference should be made to the ensuing detailed description taken in conjunction with the accompanying drawings.

DESCRIPTION OF THE PREFERRED EMBODIMENTS

The following description will describe one embodiment of the present invention. In the present embodiment, explanation will be given on an example that an aberration detection device of the present invention is used in an optical pick-up device equipped in an optical recording/reproducing device for optically recording/reproducing information on/from an optical disk as an optical recording medium.

Figure 2:
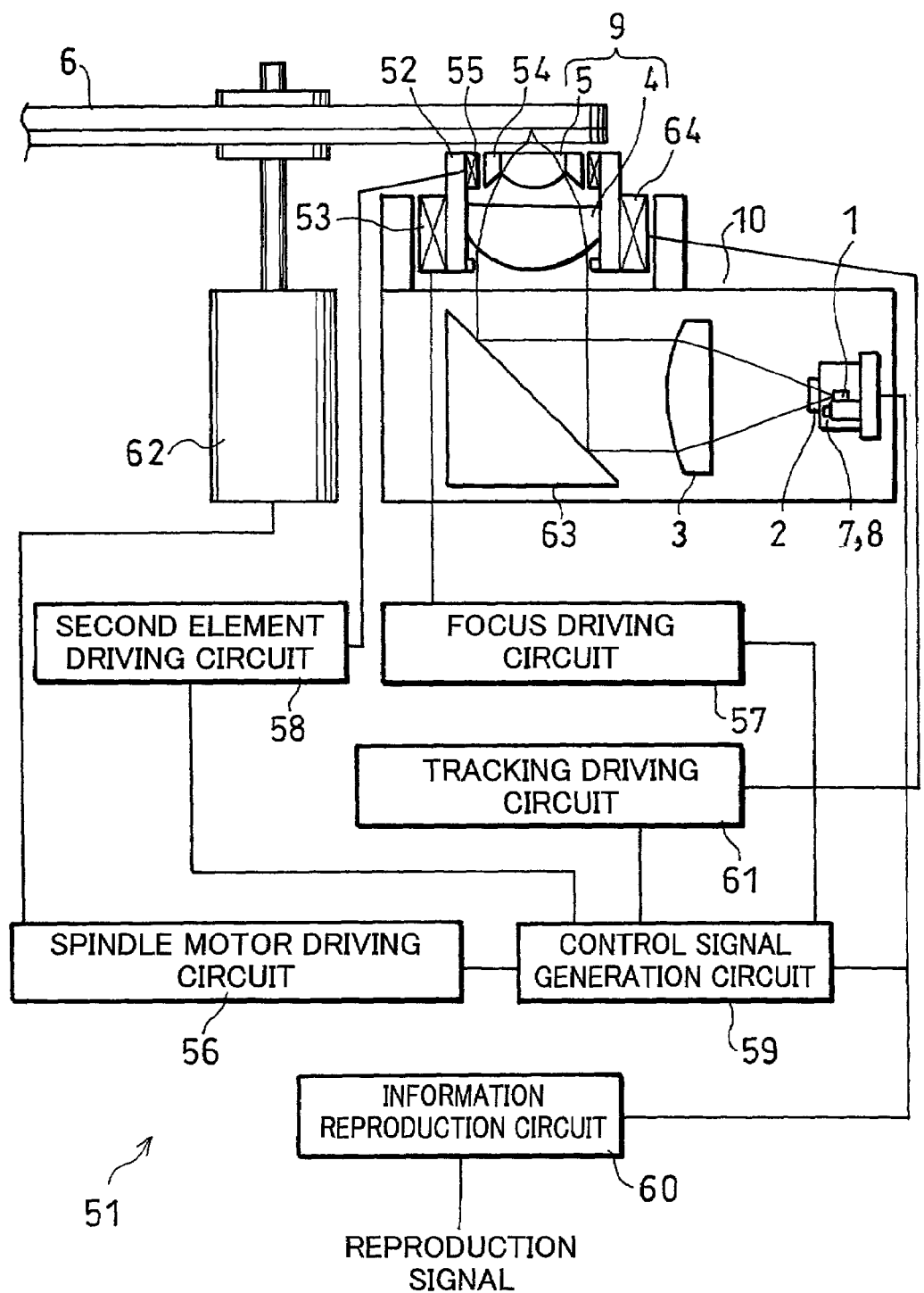
FIG. 2 is a schematic view showing an optical recording/reproducing device provided with the optical pick-up device shown in FIG. 1.

As shown in FIG. 2, an optical recording/reproducing device in accordance with the present embodiment includes a spindle motor 62 for rotating and driving an optical disk 6, which is an optical recording medium; an optical pick-up device 10 for recording/reproducing information on/from the optical disk 6; and a driving control section 51 for controlling the driving of the spindle motor 62 and the optical pick-up device 10.

The optical pick-up device 10 includes a semiconductor laser 1 as a light source for emitting a light beam to the optical disk 6, a hologram 2, a collimator lens 3, a dual element objective lens 9 as a focusing optical system, and detection devices 7 and 8.

Between the dual element objective lens 9 and the collimator lens 3 is provided a mirror 63 which refracts a light path of a light beam from the dual element objective lens 9 or a light beam from the collimator lens 3, at about 90 degrees.

The dual element objective lens 9 is structured so as to include a first lens element 4 and a second lens element 5, which are located so that a light beam emitted from the semiconductor laser 1 passes through them in this order.

The rim section of the first lens element 4 is held by a holder 52. On an outside perimetrical section of the holder 52, a focus actuator 53 and a tracking actuator 64 are provided.

The focus actuator 53 moves the dual element objective lens 9 at an appropriate position in a direction of a light axis, so as to provide focus control. The tracking actuator 64 moves the dual element objective lens 9 in a radial direction (in a direction orthogonal to the direction of tracks formed on the optical disk 6 and to the direction of the light axis), so as to provide tracking control.

By accurately controlling the driving of the tracking actuator 64, a light beam can accurately follow an information track of the optical disk 6.

The rim section of the second lens element 5 is held by a holder 54. On an inside perimetrical section of the holder 52 facing an outside perimetrical section of the holder 54, a second lens element actuator 55 is provided so as to move the second lens element 5 in the light axis direction. By controlling the driving of the second lens element actuator 55, the interval between the first lens element 4 and the second lens element 5 can be adjusted so as to correct a spherical aberration caused in the optical system of the optical pick-up device 10.

The driving control section 51 includes a spindle motor driving circuit 56 for controlling the driving of the spindle motor 62, a focus driving circuit 57 for controlling the driving of the focus actuator 53, a tracking driving circuit 61 for controlling the driving of the tracking actuator 64, a second lens element driving circuit 58 for controlling the driving of the second lens element actuator 55. The driving control section 51 further includes a control signal generation circuit 59 for generating control signals for the respective driving circuits from signals obtained by the detection devices 7 and 8, and an information reproduction circuit 60 for reproducing information recorded on the optical disk 6 from the signals obtained by the detection devices 7 and 8, and generating a reproduction signal.

The control signal generation circuit 59 generates a tracking error signal, a focus error signal FES, and a spherical aberration error signal SAES, in accordance with the signals obtained by the detection devices 7 and 8, and transmits the tracking error signal to the tracking driving circuit 61, the focus error signal FES to the focus driving circuit 57, and the spherical aberration error signal SAES to the second lens element driving circuit 58. Then, each driving circuit controls the driving of each member in accordance with each error signal.

For example, in the focus driving circuit 57, when the focus error signal FES is inputted, the focus driving circuit 57 controls the driving of the focus actuator 53 so as to move the dual element objective lens 9 in the light axis direction in accordance with a value of the FES, and correct a focus position deviation of the dual element objective lens 9.

In the second lens element driving circuit 58, when the spherical aberration error signal SAES is inputted, the second lens element driving circuit 58 controls the driving of the second lens element actuator 55 so as to move the second lens element 5 in the light axis direction in accordance with a value of the SAES, and correct the spherical aberration caused in the optical system of the optical pick-up device 10. However, when the spherical aberration is corrected by a spherical aberration correction mechanism, the interval between the first lens element 4 and the second lens element 5 of the dual element objective lens 9 is fixed, and the spherical aberration is corrected in accordance with a value of the spherical aberration error signal SAES inputted to the spherical aberration correction mechanism.

Figure 1:
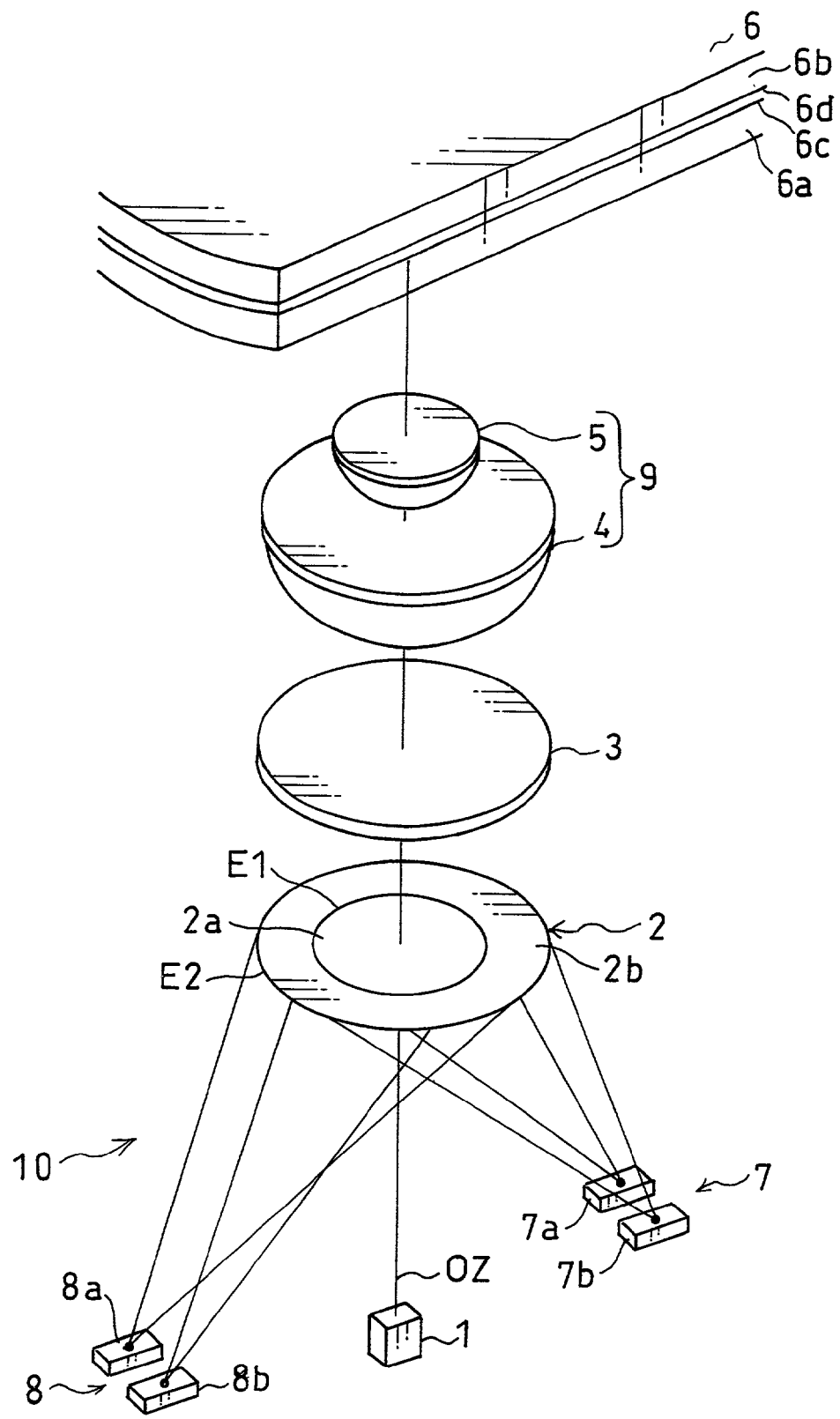
FIG. 1 is a schematic view showing an optical pick-up device of the present invention.

Referring to the FIG. 1, the following description will describe the details of the optical pick-up device 10. For convenience in explanation, the mirror 63 shown in FIG. 2 will be omitted in the optical pick-up device 10 shown in FIG. 1.

In the optical pick-up device 10, the hologram 2, the collimator lens 3, and the first lens element 4 and the second lens element 5 constituting the dual element objective lens 9 are located on a light axis OZ formed between a light beam emission surface of the semiconductor laser 1 and a light beam reflection surface of the optical disk 6. The detection devices 7 and 8 are located in proximity to focus positions of diffracted light from the hologram 2.

That is, in the optical pick-up device 10 as structured above, a light beam emitted from the semiconductor laser 1 passes through the hologram 2 as a zero-order diffraction light, and is converted into collimated light by the collimator lens 3. Then, the light beam passes through the dual element objective lens 9 constituted by the first lens element 4 and the second lens element 5, and is focused onto an information recording layer 6c or 6d of the optical disk 6.

Meanwhile, the light beam reflected by the information recording layer 6c or 6d of the optical disk 6 passes through the second lens element 5, the first lens element 4 of the dual element objective lens 9, and the collimator lens 3, is directed into the hologram 2, diffracted by the hologram 2, then focused onto the detection devices 7 and 8.

The detection device 7, including a first photoreceptor 7a and a second photoreceptor 7b, is located closer to the hologram 2 than the focus position of positive first-order diffraction light of the hologram 2. The detection device 8, including a third photoreceptor 8a and a fourth photoreceptor 8b, is located farther from the hologram 2 than the focus position of negative first-order diffraction light of the hologram 2.

The distance between the focus position of the positive first-order diffraction light of the hologram 2 and the detection device 7, and the distance between the focus position of the negative first-order diffraction light of the hologram 2 and the detection device 8, are designed to be almost identical. In these detection devices 7 and 8, a light beam is converted into an electric signal.

The optical disk 6 is constituted by a cover glass 6a, a substrate 6b, and two information recording layers 6c and 6d formed between the cover glass 6a and the substrate 6b. That is, the optical disk 6 is a two-layer disk, and the optical pick-up device 10 is structured so as to reproduce information from each information recording layer and to record information on each information recording layer, by focusing a light beam onto the information recording layer 6c or 6d.

Therefore, in the following explanation, an information recording layer of the optical disk 6 denotes either of the information recording layer 6c or 6d, and the optical pick-up device 10 is structured so as to be capable of focusing a light beam onto either of the information recording layers, and recording/reproducing information.

The hologram 2 is separated into two regions, regions 2a and 2b. The first region 2a is a region circled by a first circle E1 centered on the light axis OZ, and the second region 2b is a region between the first circle E1 and a second circle E2 centered on the light axis OZ.

As mentioned above, the hologram 2 is structured so as to allow the light emitted from the semiconductor laser 1 to pass through to the side of the optical disk 6 as the zero-order diffraction light, and to diffract the reflected light from the side of the optical disk 6 and guide the light to the detection devices 7 and 8. Therefore, each region of the hologram 2 is set so as to separately focus the positive first-order diffraction light and the negative first-order diffraction light of the light beam which is reflected by the optical disk 6, passes through and is diffracted at each region of the hologram 2, onto the respective photoreceptors of the detection devices 7 and 8.

That is, each region of the hologram 2 is structured such that, in the light beam reflected at the information recording layer 6c or 6d of the optical disk 6, the positive first-order diffraction light of a first light beam passing through the first region 2a of the hologram 2 forms a focus spot in proximity to the first photoreceptor 7a, the negative first-order diffraction light of the first light beam forms a focus spot in proximity of the fourth photoreceptor 8b, the positive first-order diffraction light of a second light beam passing through the second region 2b of the hologram 2 forms a focus spot in proximity to the second photoreceptor 7b, and the negative first-order diffraction light of the second light beam forms a focus spot in proximity to the third photoreceptor 8a.

Therefore, the positive first-order diffraction light and the negative first-order diffraction light of the light beam diffracted by each region of the hologram 2 are guided respectively to the photoreceptors of the detection devices 7 and 8.

By locating the photoreceptors of the detection devices 7 and 8 as mentioned above, the positive first-order diffraction light of the first light beam passing through the first region 2a of the hologram 2 is converted into an electric signal in the first photoreceptor 7a, the negative first-order diffraction light of the first light beam is converted into an electric signal in the fourth photoreceptor 8b, the positive first-order diffraction light of the second light beam passing through the second region 2b of the hologram 2 is converted into an electric signal in the second photoreceptor 7b, and the negative first-order diffraction light of the second light beam is converted into an electric signal in the third photoreceptor 8a.

Figure 3:
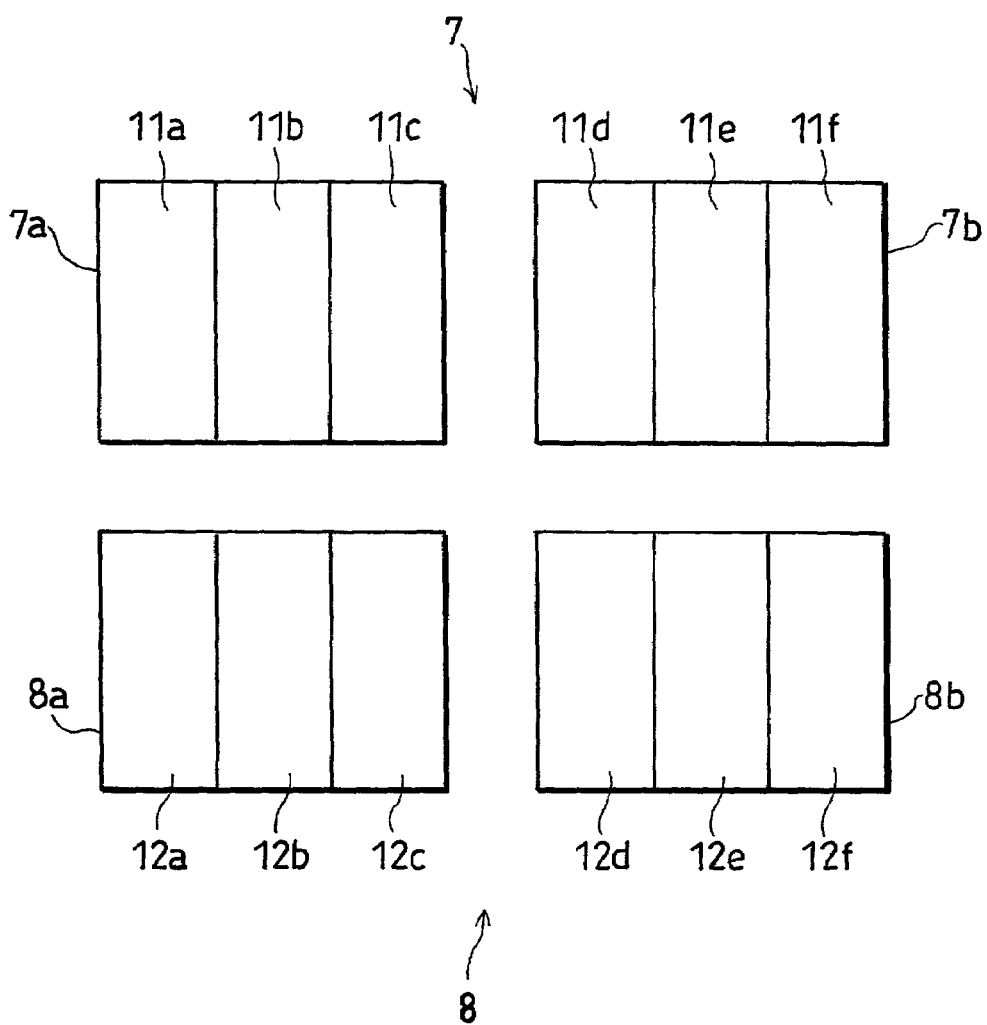
FIG. 3 is an explanatory view showing the detail of detection devices in the optical pick-up device shown in FIG. 1.

As shown in FIG. 3, each photoreceptor of the detection devices 7 and 8 includes three photodetectors placed side by side. That is, the first photoreceptor 7a includes photodetectors 11a, 11b, and 11c placed side by side, the second photoreceptor 7b includes photodetectors 11d, 11e, and 11f placed side by side, the third photoreceptor 8a includes photodetectors 12a, 12b, and 12c placed side by side, and the fourth photoreceptor 8b includes photodetectors 12d, 12e, and 12f placed side by side.

The light beams received by the photodetectors 11a through 11f and 12a through 12f are converted into electric signals, respectively. The electric signals obtained by the photodetectors 11a through 11f and 12a through 12f are inputted to the control signal generation circuit 59 (FIG. 2), and used for detecting and adjusting a focus position deviation and a spherical aberration of the dual element objective lens 9. That is, the control signal generation circuit 59 also serves as aberration detection means for detecting a spherical aberration, focus position deviation amount detection means for detecting the amount of a focus position deviation, and spherical aberration correction means for correcting the spherical aberration, of the dual element objective lens 9, which is a focusing optical system.

The electric signals obtained from the photodetectors are, for example, outputted to the information reproduction circuit 60 (FIG. 2), and converted into reproduction signals RF. Here, the reproduction signals RF recorded in the optical disk 6 is given by the total sum of the electric signals outputted from the photodetectors.

The following description will explain on the correction of a focus position deviation by using the electric signals. Here, explanation will be given on the case where a focus position deviation is corrected by using the electric signals when the amount of a spherical aberration is small so as to be negligible.

When a light beam comes into a focus on either of the information recording layer 6c or 6d of the optical disk 6, the size of a beam projected on the first photoreceptor 7a of the detection device 7 and that on the fourth photoreceptor 8b of the detection device 8 are almost identical, and the size of a beam projected on the second photoreceptor 7b of the detection device 7 and that on the third photoreceptor 8a of the detection device 8 are almost identical.

Here, a first error signal F1 is obtained from the following equation:

$$F1=(11aS+11cS-11bS)-(12dS+12fS-12eS), \quad (2)$$

where 11aS through 11cS and 12dS through 12fS are output levels of the photodetectors 11a through 11c and 12d through 12f, respectively, which convert diffraction light from the first region 2a of the hologram 2 into electric signals; and a second error signal F2 is obtained from the following equation:

$$F2=(11dS+11fS-11eS)-(12aS+12cS-12bS), \quad (3)$$

where 11dS through 11fS and 12aS through 12cS are output levels of the photodetectors 11d through 11g and 12a through 12c, respectively, which convert diffraction light from the second region 2b of the hologram 2 into electric signals. In this case, output values of the error signals F1 and F2 are 0 (zero).

When the optical disk 6 comes close to or apart from the dual element objective lens 9 and the focus position is deviated from the information recording layer 6c or 6d, the size of the beam formed on each photoreceptor varies, and values corresponding to the focus position deviations are outputted as the two error signals. Therefore, in order to keep the focus position always on the information recording layer, the dual element objective lens 9 should be moved in the light axis OZ direction so that the output values of the error signals F1 and F2 always become 0.

A method for detecting a focus position deviation by utilizing changes in the beam size as mentioned above is generally called a beam size method. Here, a focus position deviation denotes the amount of a deviation between the focus where the light beam passing through the dual element objective lens 9 from the side of the semiconductor laser 1 focuses and the position of the information recording layer 6c or 6d of the optical disk 6. Thus, when the amount of a spherical aberration is small so as to be negligible, the focus error signal FES for detecting the focus position deviation may be generated by the error signals F1 or F2.

Next, consideration will be given on the case where there is no focus position deviation and a spherical aberration is caused in the optical system of the optical pick-up system 10. It can be considered that the spherical aberration may be caused by the change in the thickness of the cover glass 6a of the optical disk 6, etc.

For example, when the thickness of the cover glass 6a changes and a spherical aberration is caused, the focus position (the position having the minimum beam diameter) of a section of a light beam close to the light axis OZ (an inner section), and the focus position of a section of the light beam outside the inner section (an outer section) are different from the focus position when there is no spherical aberration. Therefore, when a spherical aberration is caused, the first error signal F1 and the second error signal F2 come to have values which are not 0 and corresponds to the amount of the spherical aberration. Here, the first error signal F1 detects the focus position deviation of the inner section of the light beam close to the light axis OZ diffracted by the first region 2a of the hologram 2, and the second error signal F2 detects the focus position deviation of the outer section of the light beam diffracted by the second region 2b of the hologram 2.

Thus, the spherical aberration error signal SAES as a value corresponding to the amount of the spherical aberration is generated as:

$$SAES=F1, \quad (4)$$

or $$SAES=F2. \quad (5)$$

With this manner, the spherical aberration of the dual element objective lens 9 can be detected either by the first error signal F1 or the second error signal F2.

However, focus position deviations in the inner section and the outer section of the light beam due to a spherical aberration are caused in different directions, so the beam size changes differently in the inner section and the outer section of the light beam. Thus, unless the light beam is accurately separated into the inner section and the outer section, the change in the beam size becomes smaller, failing to detect the spherical aberration sensitively.

The following description will explain the separation of the light beam into the inner section and the outer section when a spherical aberration is caused in the optical system of the optical pick-up device 10.

Figure 4:
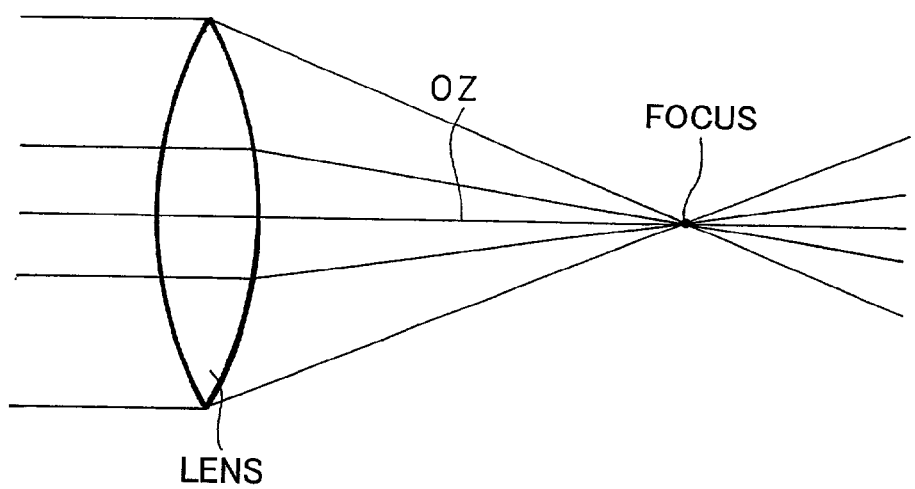
FIG. 4(a) is an explanatory view showing a focus position of a light beam in a lens having no spherical aberration.
FIG. 4(b) is an explanatory view showing focus positions of a light beam in a lens having a spherical aberration.
Figure 4:
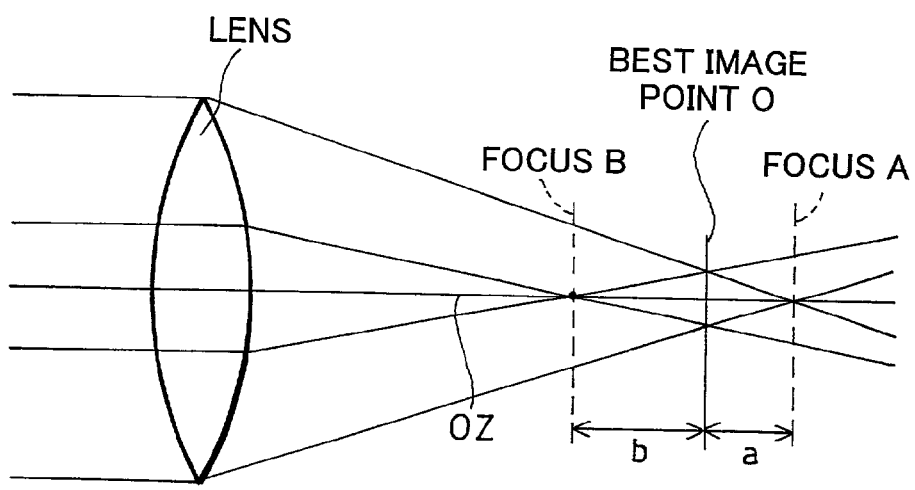

First, when there is no spherical aberration in the light beam, as shown in FIG. 4(a), the light beam is focused at a point (a focus) on the light axis OZ.

On the other hand, when a spherical aberration is caused in the light beam, as shown in FIG. 4(b), a focus A is formed by the light beam passing through the outer section of a lens at a position far from a best image point O on the light axis OZ, and a focus B is formed by the light beam passing through the inner section of the lens, the section close to the light axis OZ, at a position in front of the best image point O. Here, the best image point O denotes an image point where the light beam has a minimum beam diameter.

Therefore, as shown in FIG. 4(b), the spherical aberration amount when the spherical aberration is caused in the light beam can be expressed by a distance a between the best image point O and the focus A, or a distance b between the best image point O and the focus B. The spherical aberration is corrected by using either of the distances a and b.

Consequently, in order to correct the spherical aberration accurately, it is necessary to accurately detect the distance a and the distance b which indicate the spherical aberration amounts. That is, it is necessary to detect the spherical aberration sensitively.

Hence, a separation radius of the light beam so as to detect the spherical aberration sensitively will be obtained, considering a wave front.

Figure 5:
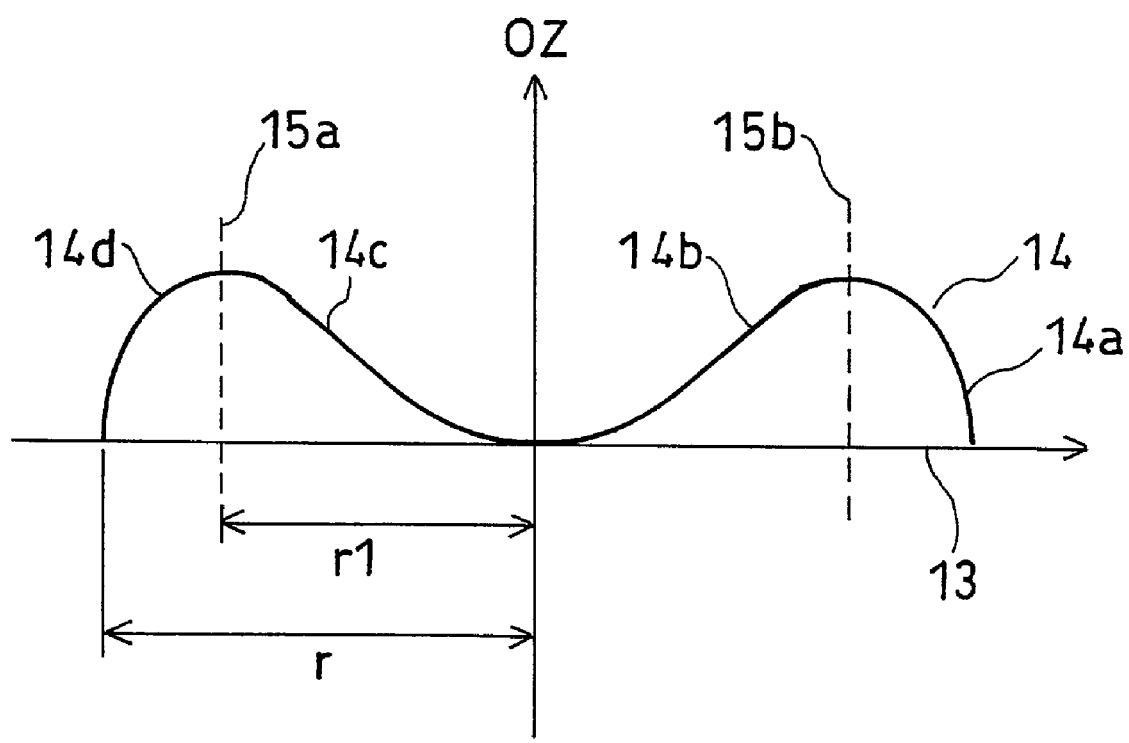
FIG. 5 is a concept view showing a wave front aberration when a spherical aberration is caused.

FIG. 5 shows a wave front aberration when a spherical aberration is caused as shown in FIG. 4(b). Here, an ideal wave front 13 obtained when there is no spherical aberration coincides with a straight line perpendicular to the light axis OZ. A wave front 14 obtained when a light beam forms the best image point O on the information recording layer of the optical disk 6 when a spherical aberration is caused is shown by a symmetric curve with respect to the light axis OZ.

In the actual optical pick-up device 10, the dual element objective lens 9 is moved so that the focus error signal FES becomes 0, and adjusted so as to form a best image surface (a light beam emitted surface formed by the best image point) on the information recording layer.

It is clear from FIG. 5 that the proceeding direction of the wave front 14 changes at boundaries 15a and 15b. The boundaries 15a and 15b are located at an extreme value of the wave front 14.

Figure 6:
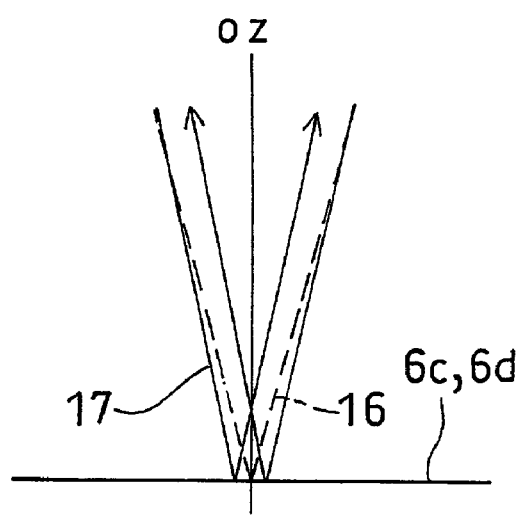
FIG. 6(a) is an explanatory view showing focusing states of a light beam close to a light axis, within boundaries drawn at an extreme value of a wave front of the wave front aberration shown in FIG. 5.
FIG. 6(b) is an explanatory view showing focusing states of a light beam apart from the light axis, outside the boundaries drawn at the extreme value of the wave front of the wave front aberration shown in FIG. 5.
Figure 6:
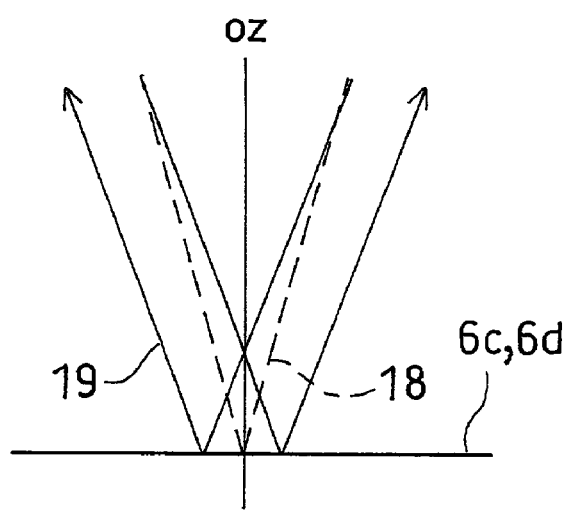

FIG. 6(a) shows focusing states of wave fronts 14b and 14c located close to the light axis OZ within the boundaries 15a and 15b, focusing on the information recording layer 6c or 6d of the optical disk 6. Here, the reference numeral 16 denotes focused light when there is no spherical aberration, having a focus on the information recording layer 6c or 6d on the light axis OZ. The reference numeral 17 denotes focused light when a spherical aberration is caused. It is shown that the wave fronts 14b and 14c in FIG. 5 have an image point having the minimum beam diameter far from the information recording layer 6c or 6d, compared with the case where there is no spherical aberration.

On the other hand, FIG. 6(b) shows reflecting states of wave fronts 14a and 14d located far from the light axis OZ outside the boundaries 15a and 15b, reflected on the information recording layer 6c or 6d of the optical disk 6. Here, the reference numeral 18 denotes reflected light when there is no spherical aberration, having a focus on the information recording layer 6c or 6d on the light axis OZ. The reference numeral 19 denotes reflected light when a spherical aberration is caused. It is shown that the wave fronts 14a and 14d in FIG. 5 have an image point having the minimum beam diameter at the front of the information recording layer 6c or 6d, compared with the case where there is no spherical aberration.

These states correspond to the focusing state shown in the foregoing FIG. 4(b).

Thus, when the light beam is separated at the boundaries 15a and 15b in FIG. 5, into a section close to the light axis OZ and a section far from the light axis OZ, the light beam can be separated into a light beam having a focus far from the information recording layer 6c or 6d and a light beam having a focus at the front of the information recording layer 6c or 6d. Therefore, the spherical aberration can be detected sensitively by either of the focus position deviations.

Hence, the position of the boundaries 15a and 15b will be sought. Generally, in order to analyze an aberration of a wave front, the form of the wave front is fitted by the least square approximation method using the Zernike polynomials, and the third-order aberration is obtained from a coefficient of the polynomials. When the wave front shown in FIG. 5 is fitted by the least square approximation method using the Zernike polynomials, the form of the wave front is determined by the term $6q^4-6q^2+1$ (where q is a distance from the beam center normalized by the beam effective radius). When an extreme value of the wave front 14 is obtained in this manner, the position of the boundaries 15a and 15b can be found, and a distance r1 from the light axis OZ to the boundary and a beam radius r in FIG. 5 virtually satisfy the following equation:

$$r1 = 0.7r \quad (6)$$

The light beam is separated by the hologram 2 into the inner section and the outer section. Therefore, the spherical aberration can be detected sensitively when the radius of the circle E1 forming the region 2a of the hologram 2 is set so that the light beam having a radius virtually not more than 70 percent of a light beam effective radius determined by an aperture of the dual element objective lens 9 is diffracted by the region 2a of the hologram 2, and the outside light beam is diffracted by the region 2b of the hologram 2.

Figure 7:
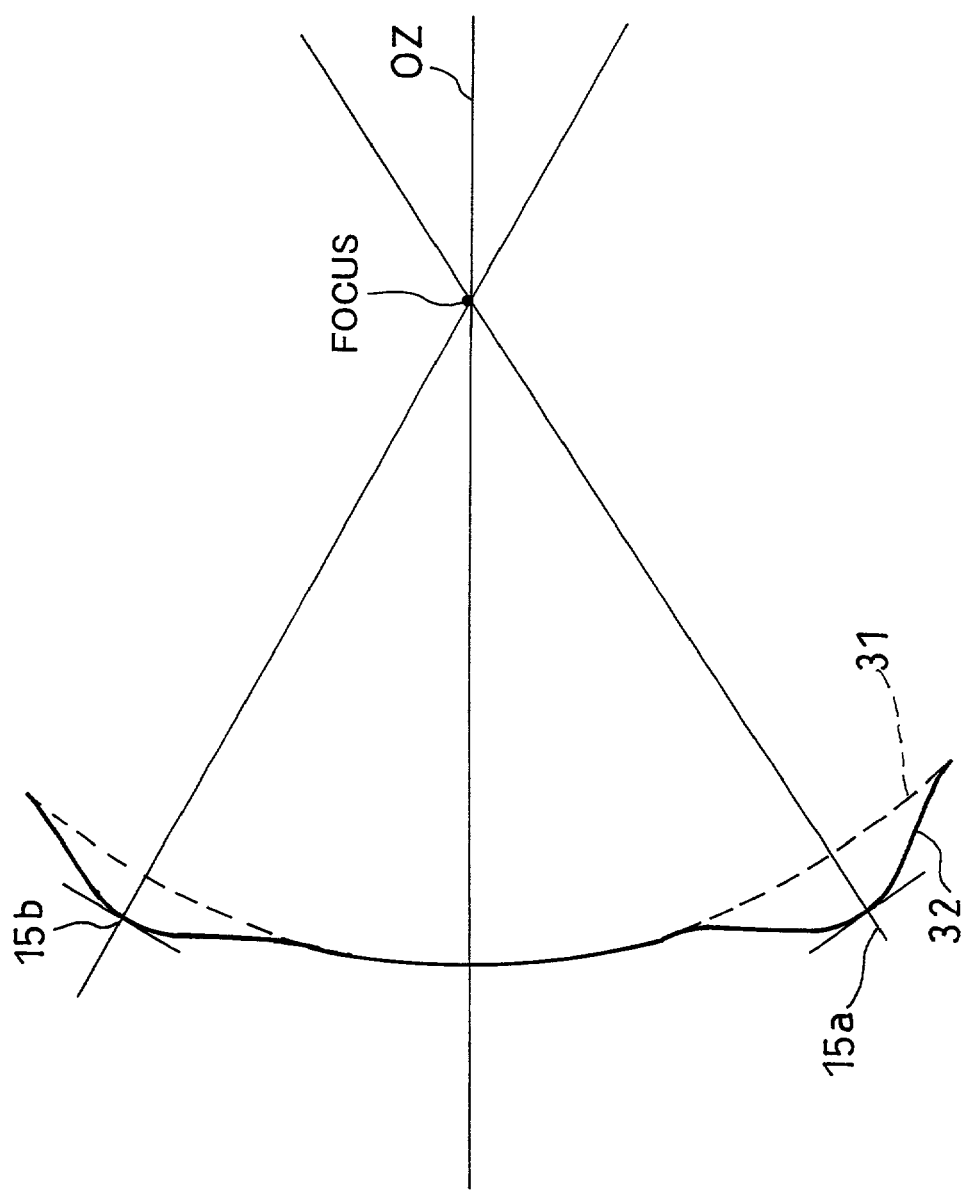
FIG. 7 is an explanatory view showing the relationship of a focus position in a case having no spherical aberration, and a focus position at an extreme value of a wave front in a case having a spherical aberration.

That is, as shown in FIG. 7, the focus position in an ideal wave front 31 having no spherical aberration coincides with the focus position at the extreme value on the boundaries 15a and 15b in a wave front 32 having a spherical aberration. Thus, as long as the light beam is separated at the extreme value of the wave front 32, even if the focus position in the optical pick-up device 10 is deviated, the focus position of the extreme value is deviated likewise, so the spherical aberration can be always correctly detected.

Figure 8:
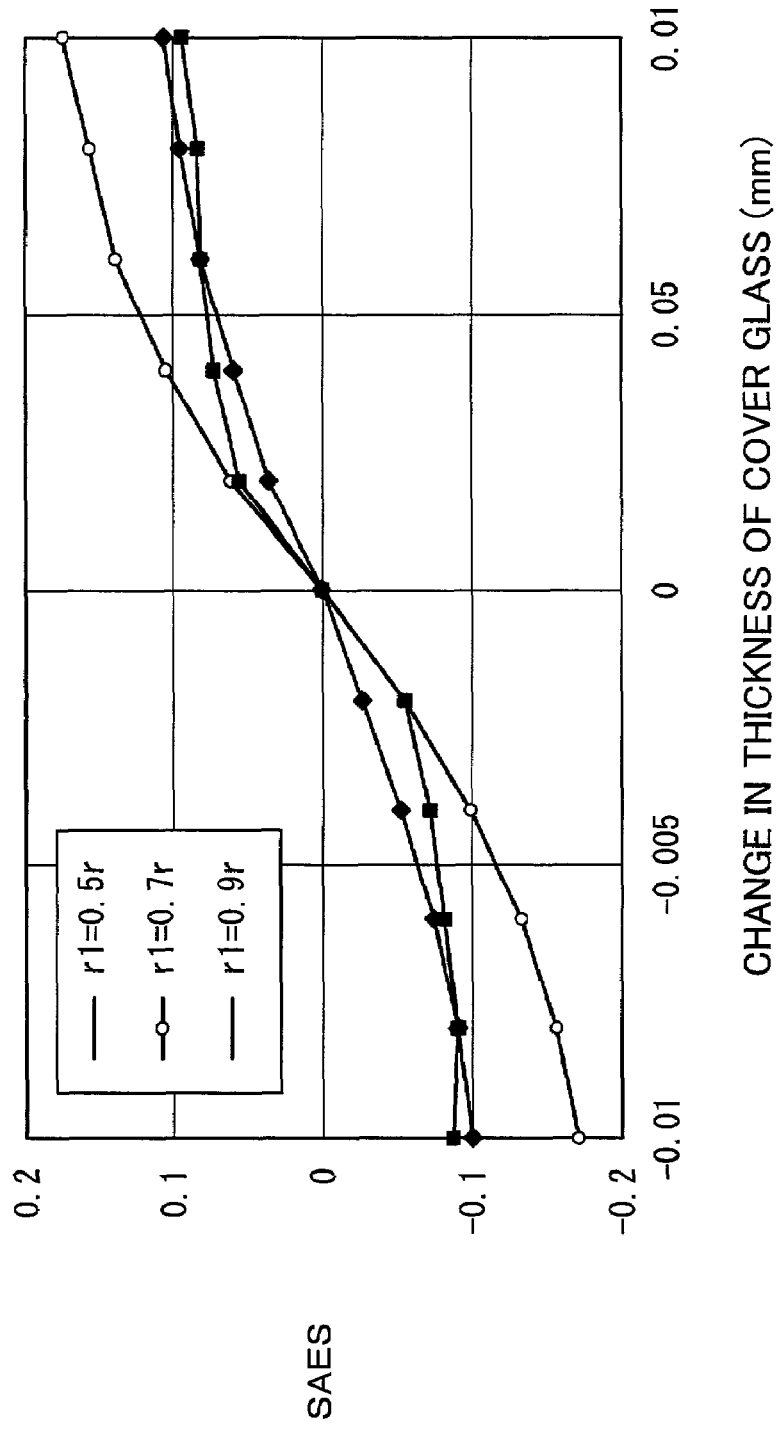
FIG. 8 is a graph showing the relationship between a spherical aberration error signal SAES and change in the thickness of cover glass of an optical disk in the optical pick-up device shown in FIG. 1.

FIG. 8 is a graph showing the relationship between the spherical aberration error signal SAES and change in the thickness of the cover glass 6a of the optical disk 6. This graph shows the change of the SAES when the r1, which is the separation radius of a circle separating the hologram 2 into two sections, is 0.5r, 0.7r, and 0.9r. It is clear from FIG. 8 that the sensitivity of the SAES becomes best when the separation radius of a beam is 70 percent of the beam effective radius (r1=0.7r).

In the foregoing explanation, consideration has been given on a method for detecting a spherical aberration when there is no focus position deviation and a spherical aberration is caused in the optical system of the optical pick-up system 10. Here, since the detection of the spherical aberration is considered based on a case where there is no focus position deviation, the light beam on the information recording layer 6c or 6d should form the best image point.

However, if a spherical aberration is caused, the error signals F1 and F2 vary according to the spherical aberration, so it is not preferable to use the F1 or the F2 only to designate the focus error signal FES showing the amount of the focus position deviation. In other words, when a focus position deviation is caused in the optical system of the optical pick-up device 10, that is, when a focus error is caused, the method for detecting the spherical aberration as mentioned above cannot be adopted.

Hence, the following description will explain a method for detecting a spherical aberration considering a focus position deviation.

Then, explanation will be given on the generation of the spherical aberration error signal SAES and the focus error signal FES when a spherical aberration is caused and there is a focus position deviation.

It is clear from the explanation of FIG. 5 that the error signals F1 and F2 are subjected to positive and negative effects by the spherical aberration, respectively. Therefore, it is desirable to generate the focus error signal FES in which the effect of the spherical aberration is restrained as much as possible, by using both of the F1 and the F2, as shown in the equation (7);

$$FES=F1+F2 \quad (7)$$

When a spherical aberration and a focus position deviation are caused, if the error signal F1 or F2 is directly used so as to designate the spherical aberration signal, the spherical aberration error signal SAES varies according to the focus position deviation, failing to detect the spherical aberration correctly. Thus, it is necessary to detect the spherical aberration with restraining the effect of the focus position deviation. In order to restrain the effect of the focus position deviation, the spherical aberration error signal SAES can be obtained from the following equation (8):

$$SAES=F1-(F1+F2)\times k1 \quad (k1: \text{a coefficient}) \quad (8)$$

or the following equation (9):

$$SAES=F2-(F1+F2)\times k2 \quad (k2: \text{a coefficient}) \quad (9)$$

Here, the coefficients k1 and k2 may be determined as long as the SAES changes little even if a focus position deviation is caused.

Figure 9:
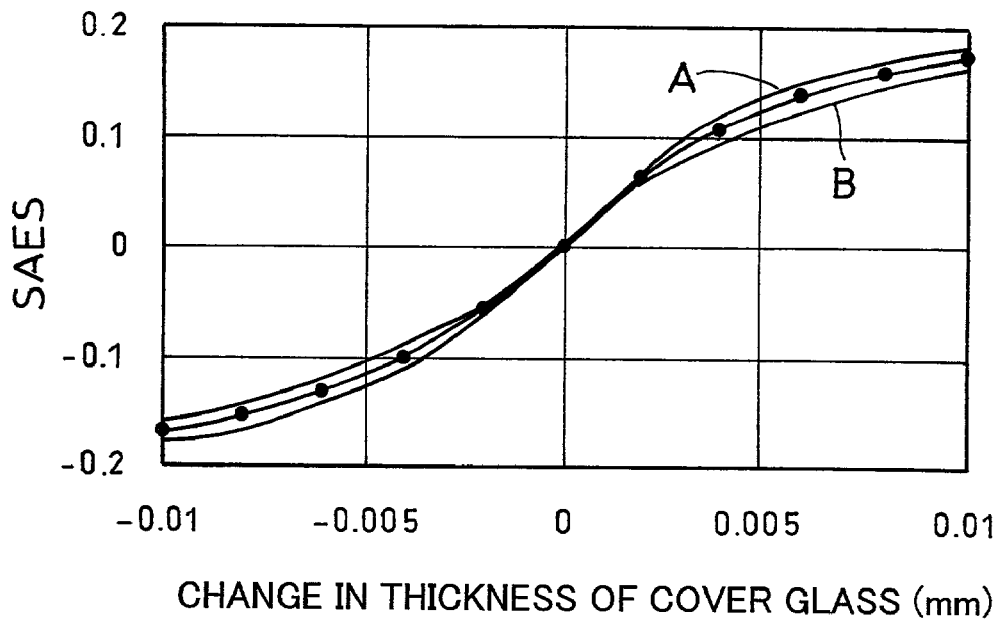
FIG. 9(a) is a graph showing the relationship between the spherical aberration error signal SAES and change in the thickness of cover glass of an optical disk in an optical pick-up device when a focus position deviation is corrected.
FIG. 9(b) is a graph showing the relationship between the spherical aberration error signal SAES and change in the thickness of the cover glass of the optical disk in the optical pick-up device when the focus position deviation is not corrected.
Figure 9:
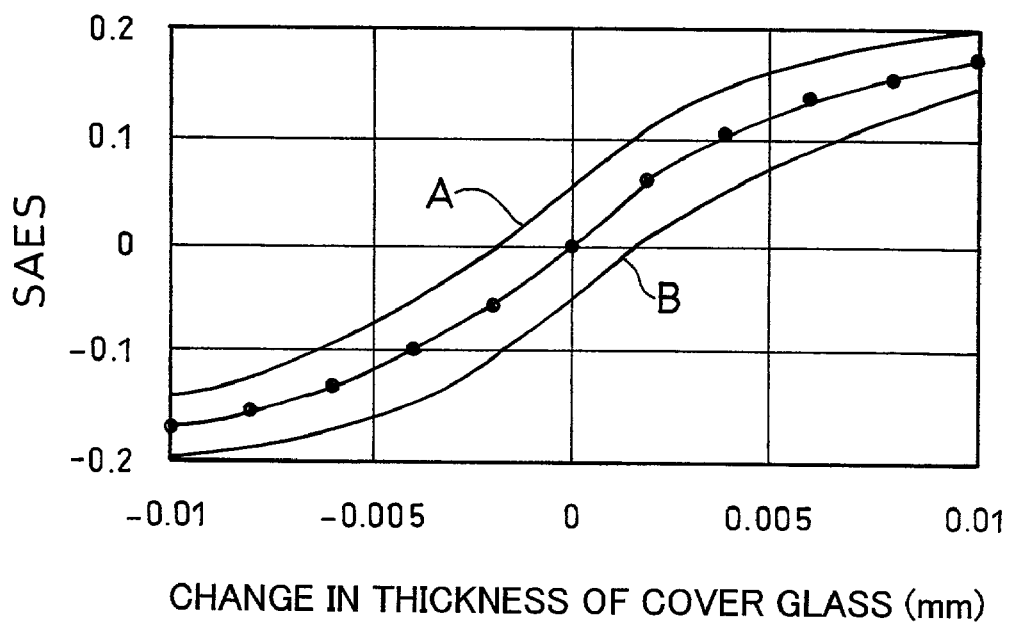

Here, FIG. 9(a) is a graph showing the relationship between the SAES and change in the thickness of the cover glass 6a when the SAES is obtained from the equation (8). FIG. 9(b) is a graph showing the relationship between the SAES and change in the thickness of the cover glass 6a when the SAES is obtained from the equation (4). A and B shown in FIGS. 9(a) and 9(b) denote changes when an offset is caused in the SAES due to the focus position deviation caused by the changes of the distance between the dual element objective lens 9 and the optical disk 6 by ±0.2 μm.

It is clear from the graphs shown in FIGS. 9(a) and 9(b) that, when the SAES is obtained from the equation (8), the effect of the focus position deviation can be restrained, and the spherical aberration can be accurately detected.

The foregoing two methods for detecting a spherical aberration assume a case where the center of a light beam coincides with the center of the hologram 2. However, the actual optical pick-up device 10 provides tracking control in which the dual element objective lens 9 is moved in a radial direction (a radius direction) of the optical disk 6 so as to always focus a light beam on a track formed on the information recording layer 6c or 6e of the optical disk 6.

While there is no problem when the hologram 2 and the dual element objective lens 9 are integrated, when they are separately provided in the optical pick-up device 10, there may be cases where the center of a light beam deviates from the center of the hologram 2 due to tracking control. Here, if the hologram 2 is concentrically formed as shown in FIG. 1, the light beam which should be originally diffracted in the region 2a of the hologram 2 circled by the first circle E1 centered on the light axis OZ, and the light beam which should be originally diffracted in the region 2b of the hologram 2 between the first circle E1 and the second circle E2 centered on the light axis OZ, are partially diffracted in another region, respectively.

In this manner, electric signals obtained from the photodetectors vary when there is a deviation between the center of the light beam and the center of the hologram 2 and when there is no deviation between them. Thus, the spherical aberration error signal SAES varies according to the amount of the deviation between the center of the light beam and the center of the hologram 2, even if the spherical aberration amount is constant.

Figure 10:
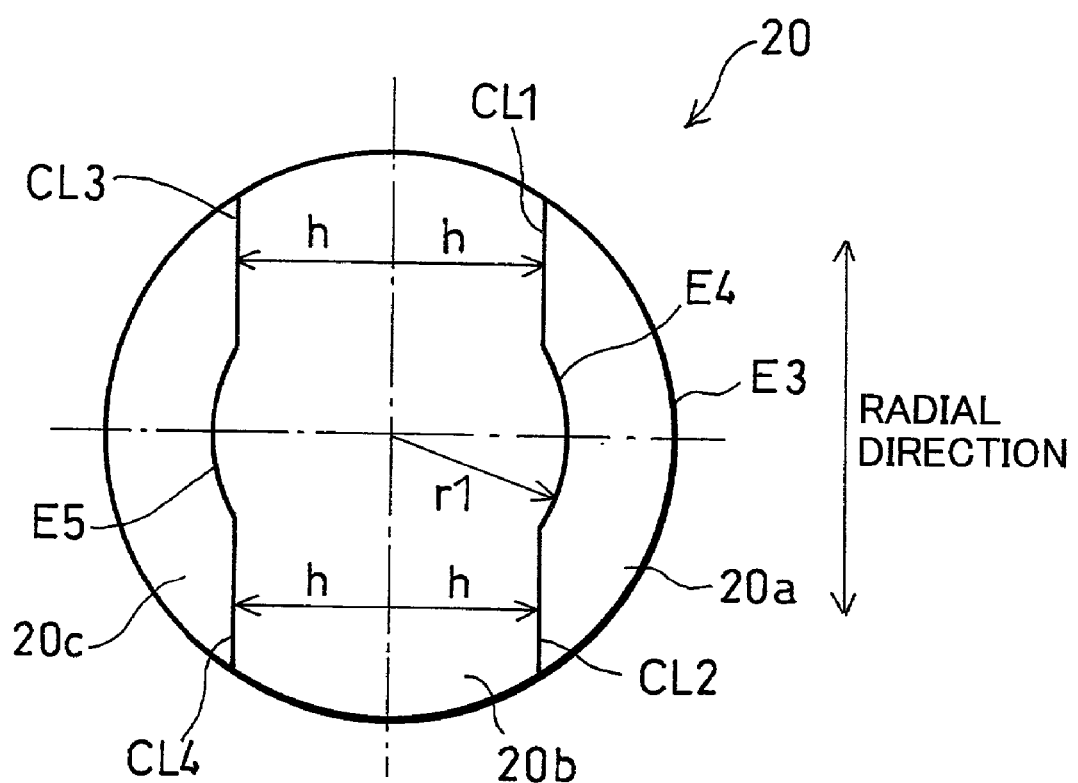
FIG. 10 is a plan view of a hologram having another separation pattern applied to the optical pick-up device of the present invention.

Consequently, in order to restrain the effect of the deviation of the light axis OZ in the radial direction of the optical disk 6 upon a spherical aberration signal as much as possible, for example, a hologram 20 having a separation pattern as shown in FIG. 10 may be used. The hologram 20 is structured so as to include three regions 20a, 20b, and 20c, as shown in FIG. 10.

The region 20a is a region surrounded by straight lines CL1 and CL2 which are orthogonal to the light axis OZ and parallel to the radial direction of the optical disk 6, a circle E3, and an arc E4. The region 20b is a region surrounded by the straight lines CL1 and CL2, straight lines CL3 and CL4 which are orthogonal to the light axis OZ and parallel to the radial direction of the optical disk 6, the circle E3, the arc E4, and an arc E5. The region 20c is a region surrounded by the straight lines CL3 and CL4, the circle E3, and the arc E5.

Here, the straight lines CL1, CL2, CL3, and CL4 are apart from a center line of the circle by an identical distance h. The arcs E4 and E5 are the arcs having a radius of r1. The hologram patterns of the regions 20a and 20c are formed so as to focus a light beam on an identical point.

That is, the hologram patterns of the respective regions of the hologram 20 are formed so that the light beams diffracted in the regions 20a and 20c are guided to the second photoreceptor 7b of the detection device 7 and the third photoreceptor 8a of the detection device 8, and the light beam diffracted in the region 20b is guided to the first photoreceptor 7a of the detection device 7 and the fourth photoreceptor 8b of the detection device 8.

According to the hologram 20 as structured above, even if the center of the light beam is moved in the radial direction of the optical disk 6 due to tracking control, the light beams designed so as to be directed into the respective regions of the hologram 20 are hardly directed into different regions of the hologram 20. Thus, the spherical aberration can be detected from the error signals detected by the light beams diffracted in the regions 20a and 20c and the error signal detected by the light beam diffracted in the region 20b, by using the equation (8) or (9).

Even with a pattern like the hologram 20, there is a possibility that the light beams may be directed into the regions different from the regions they should be originally directed, in an area in proximity to the arcs E4 and E5, due to the shift of the objective lens during tracking control. Thus, a separation pattern separated by completely straight lines, as a hologram 21 shown in FIG. 11, may also be considered.

Here, hologram patterns in regions 21a and 21c, the regions outside the center of the hologram 21, are formed so as to focus a light beam on an identical point, in the same way as the regions 20a and 20c of the hologram 20 shown in FIG. 10.

Figure 11:
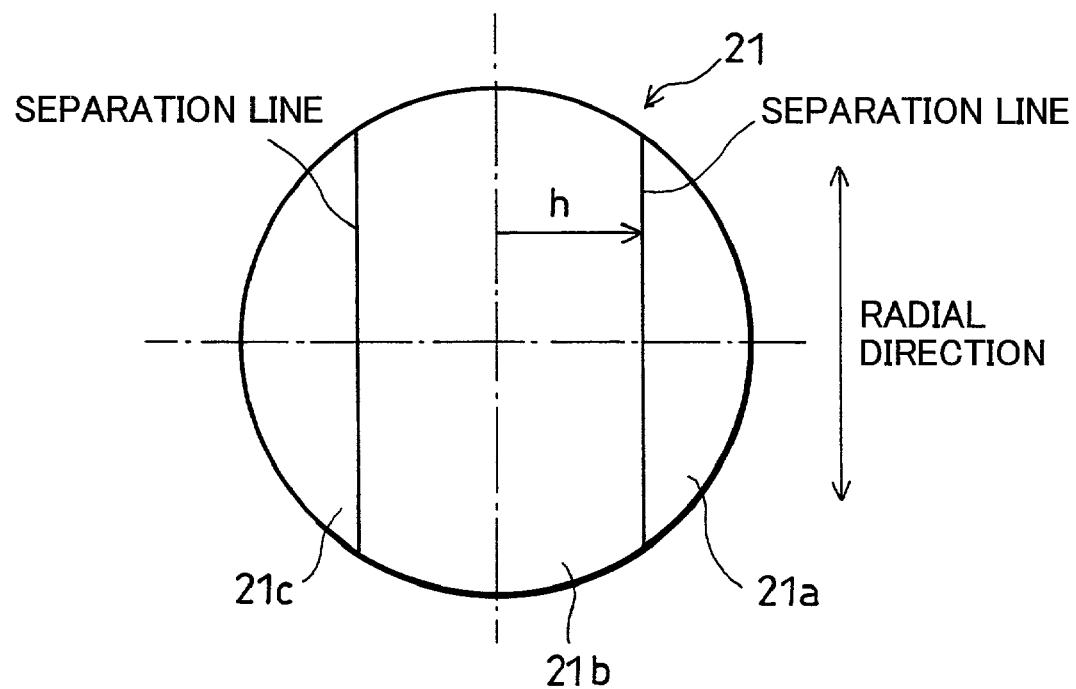
FIG. 11 is a plan view of a hologram having still another separation pattern applied to the optical pick-up device of the present invention.
Figure 12:
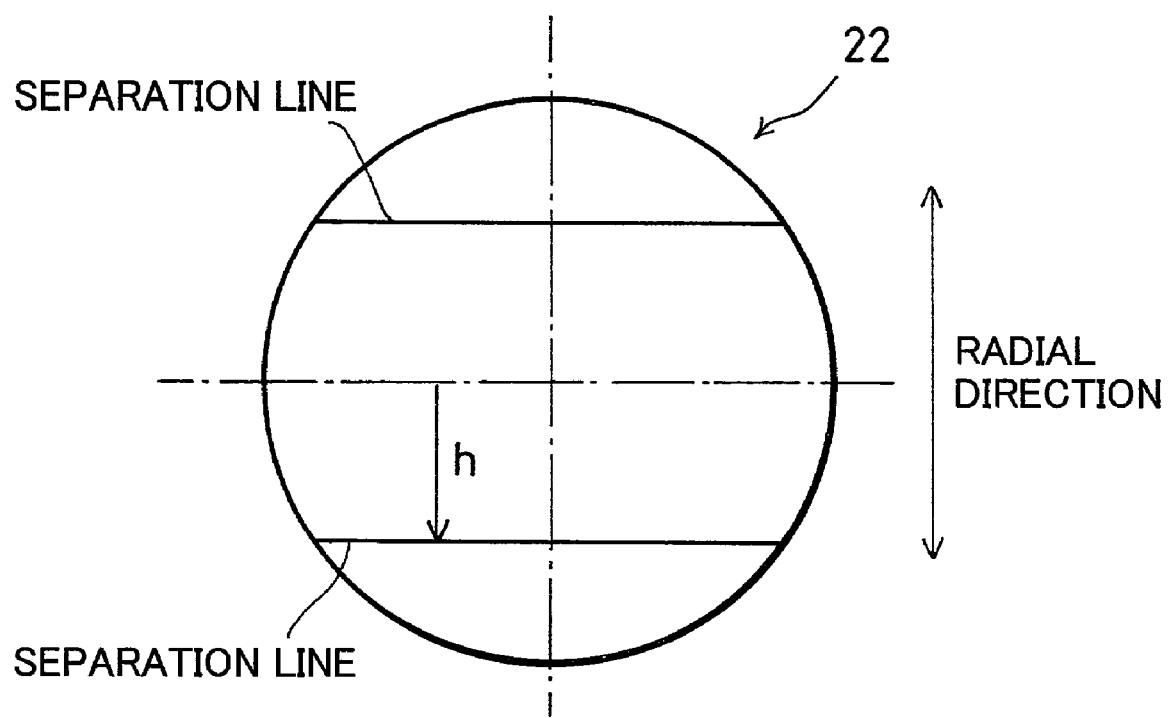
FIG. 12 is a plan view of a hologram as a comparison example for the hologram shown in FIG. 11.
Figure 13:
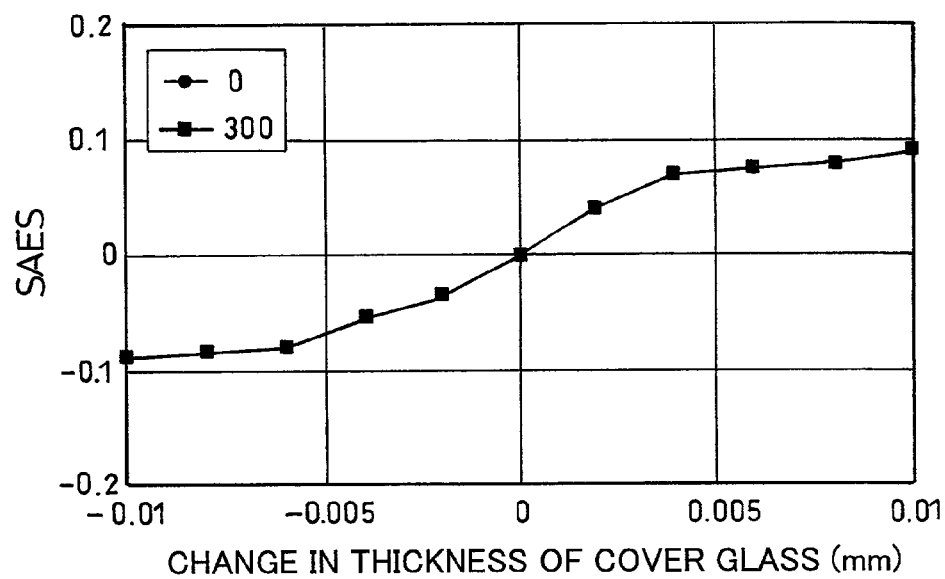
FIG. 13(a) is a graph showing the relationship between the spherical aberration error signal SAES and change in the thickness of cover glass of an optical disk in an optical pick-up device when the hologram shown in FIG. 11 is used.
FIG. 13(b) is a graph showing the relationship between the spherical aberration error signal SAES and change in thickness of the cover glass of the optical disk in the optical pick-up device when the hologram shown in FIG. 12 is used.
Figure 13:
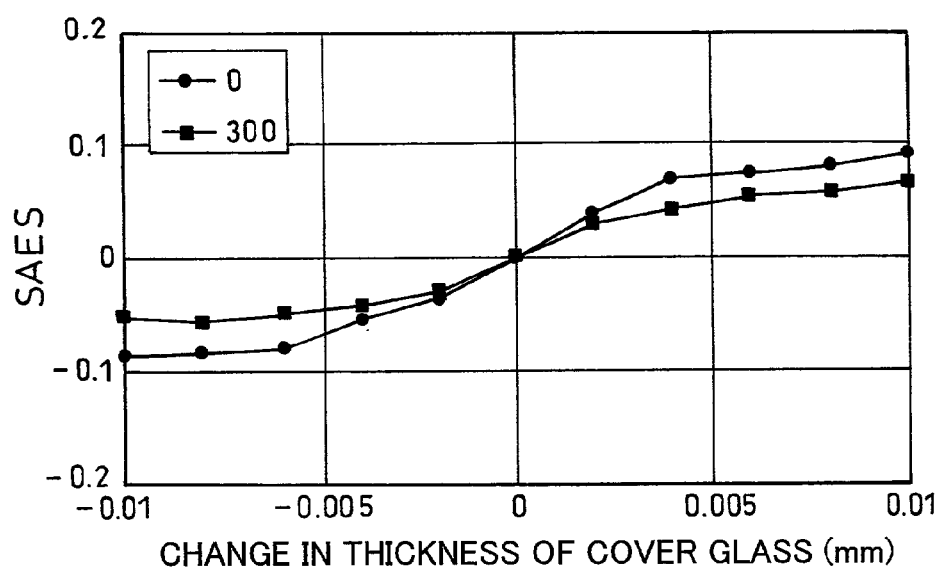

Here, FIG. 13(a) is a graph showing the relationship between the spherical aberration error signal SAES and change in the thickness of the cover glass 6a when the hologram 21 shown in FIG. 11 is used. FIG. 13(b) is a graph showing the relationship between the spherical aberration error signal SAES and change in the thickness of the cover glass 6a when a hologram 22, which has a hologram pattern separated by straight lines perpendicular to the radial direction as shown in FIG. 12, is used, as a comparison example. The distance h between the center line of the circle and a separation line in the holograms 21 and 22 is calculated as h=0.6r.

In the graphs shown in FIGS. 13(a) and 13(b), the SAES obtained when the center of the hologram and the center of the light beam are not deviated, that is, when the deviation amount is 0 µm, and the SAES obtained when the center of the hologram and the center of the light beam are deviated by 300 µm in the radial direction of the optical disk 6 due to tracking control, are shown together.

It is clear from FIGS. 13(a) and 13(b) that, when the light beam is separated by the hologram 21, the SAES is unaffected even if the center of the hologram 21 and the center of the light beam are deviated by 300 µm, but when the light beam is separated by the hologram 22, the SAES is apparently affected by the deviation of the center of the hologram 22 and the center of the light beam.

In the present embodiment, the first region and the second region of the hologram are separated by a circle or an arc, but the present invention is not limited to this. It can also be considered that the hologram is separated by, for example, a polygon such as a quadrilateral or a free curve. However, according to the explanation on the present embodiment, it is considered to be more appropriate to separate the hologram by a circle or an arc so as to detect the spherical aberration sensitively.

In the present embodiment, the hologram 2, 20, or 21 is used as means for guiding the light beam reflected from the information recording layer of the optical disk 6 to the detection devices 7 and 8, but the present invention is not limited to this. For example, the combination of a beam splitter and a wedge prism may be used as the guiding means. However, it is preferable to use a hologram so as to downsize a device.

Figure 14:
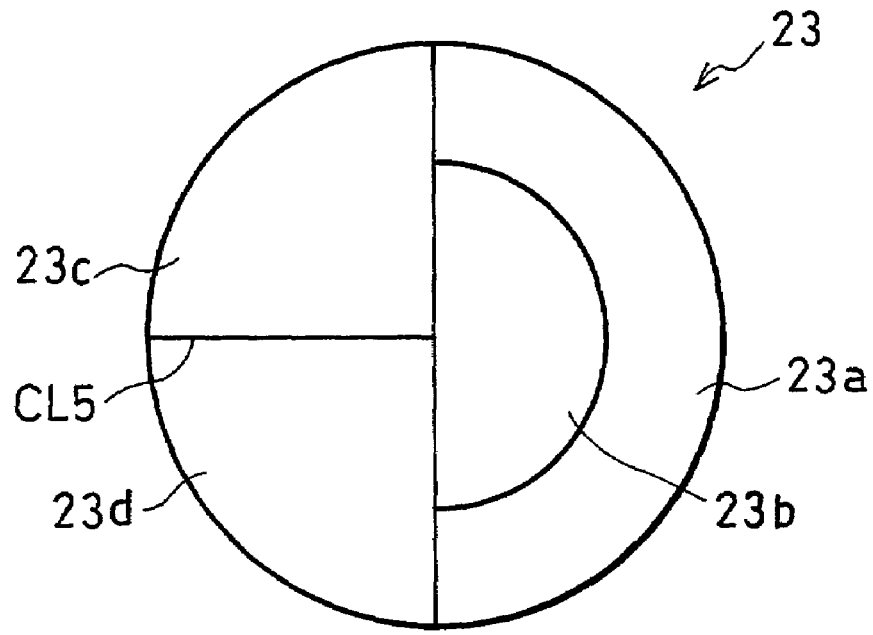
FIGS. 14(a) and 14(b) are plan views of holograms having still another separation patterns applied to the optical pick-up device of the present invention.
Figure 14:
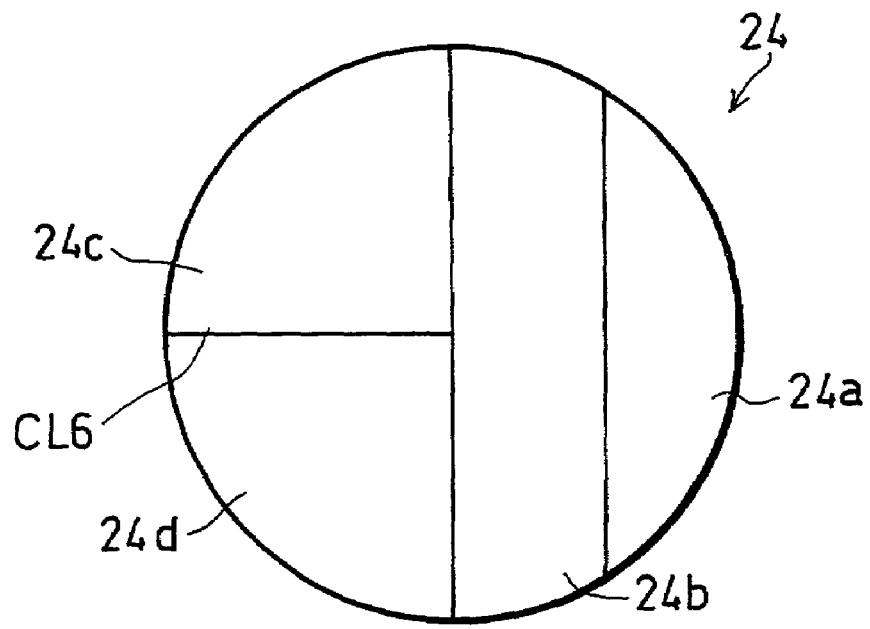

In the present embodiment, the beam size method is utilized, but the present invention is not limited to this. The spherical aberration can be detected also by the knife edge method which uses a hologram 23 or 24 having a separation pattern shown in FIG. 14(a) or 14(b), and the photoreceptor changed so as to have two photodetectors, to detect a focus position deviation from the light beam diffracted in regions 23a and 23b or regions 24a and 24b.

Further, at this time, it is possible to separate the remaining half area of the hologram 23 or 24 by a straight line CL5 or CL6 parallel to the radial direction, and to provide tracking control according to a difference between electric signals generated by light beams diffracted from separated regions 23c and 23d or 24c and 24d. This detection method utilizes a phenomenon that an unbalance is caused in a reflected diffraction light pattern in the radial direction in accordance with the positional relationship between a track and a focus spot, and is generally referred to as the push-pull method.

As means for correcting a spherical aberration caused in the optical system of the optical pick-up device 10, using the spherical aberration detected by the foregoing detection method, it can be considered to use means for correcting the spherical aberration by adjusting the interval between the first lens element 4 and the second lens element 5 of the dual element objective lens 9, as explained in FIG. 2, but the present invention is not limited to this.

For example, the collimator lens 3 may be moved so as to adjust the interval between the semiconductor laser 1 and the collimator lens 3. In this case, the light beam emitted from the semiconductor laser 1 and passing through the collimator lens 3 becomes not parallel and can cause a spherical aberration, which can be used to correct a spherical aberration of the optical system of the optical pick-up device 10.

Further, as means for correcting a spherical aberration, a spherical aberration correction mechanism may be inserted between the dual element objective lens 9 and the collimator lens 3. The spherical aberration correction mechanism constitutes an optical system for causing a spherical aberration when a light beam passes through the mechanism. For example, an afocal optical system in which a convex lens having a positive power and a concave lens having a negative power are combined may be used as a spherical aberration correction mechanism. The mechanism can cause a spherical aberration by adjusting the interval of the two lenses.

As another structure of the spherical aberration correction mechanism, an afocal optical system in which two convex lenses having a positive power are combined may be used. Also in this case, a spherical aberration can be caused by adjusting the interval of the two lenses.

Generally, in the dual element objective lens 9, a spherical aberration is sufficiently corrected with respect to a predetermined thickness of the cover glass 6a and a predetermined information recording layer. That is, a light beam focusing on a predetermined information recording layer does not include a spherical aberration, and the beam diameter of the light beam is substantially small.

However, in the present embodiment, a spherical aberration is corrected by adjusting the interval between the first lens element 4 and the second lens element 5 constituting the dual element objective lens 9. Thus, in the dual element objective lens 9, a spherical aberration does not have to be sufficiently corrected with respect to a predetermined thickness of the cover glass 6a and a predetermined information recording layer.

That is, when assembling the dual element objective lens 9 or the optical pick-up device 10 including the dual element objective lens 9, it is satisfactory to adjust the interval between the first lens element 4 and the second lens element 5 at a virtually predetermined value, and the interval may include a lens interval error. By the lens interval error caused during assembling, a spherical aberration is caused in the dual element objective lens 9. Further, when manufacturing the first lens element 4 and the second lens element 5, the first lens element 4 and the second lens element 5 may have lens thickness errors. By the lens thickness errors, a spherical aberration is caused in the dual element objective lens 9.

The spherical aberration caused in the dual element objective lens 9 by the lens interval error and the lens thickness errors is measured as the spherical aberration error signal SAES, and can be corrected in accordance with the spherical aberration error signal SAES.

In the present embodiment, the dual element objective lens 9 is constituted by two lenses, the first lens element 4 and the second lens element 5, but an objective lens may be constituted by one lens so as to simplify the assembly of the device.

In the present embodiment, a two-layer disk having two information recording layers is taken as an example of a recording medium, but the present invention is not limited to this. It is needless to say that a single layer disk having only one information recording layer may also be used, and even a multiple-layer disk having a plurality of information recording layers may also be adopted. In either case, a spherical aberration can be detected and corrected by a method as mentioned above.

An aberration detection device of the present invention may be structured so as to include:

means for adjusting a focusing optical system at a best image point; and aberration detection means for detecting a spherical aberration of the focusing optical system, in accordance with at least one of focus positions of a first light beam and a second light beam, the first light beam in which a light beam passing through in proximity to a light axis which is a center of a light beam passing through the focusing optical system makes up a substantial proportion, and the second light beam in which a light beam passing through an outside of an area in proximity to the light axis makes up a substantial proportion.

Also with this structure, a spherical aberration in the focusing optical system can be optically detected.

The foregoing aberration detection means may be structured so as to include:

a first and a second focus error detection sections for detecting a focus position deviation of the first light beam and a focus position deviation of the second light beam independently; and light beam separation means for guiding the first and the second light beams to the first and the second focus error detection sections, respectively, from the light beam passing through the focusing optical system, wherein a spherical aberration error signal SAES and a focus error signal FES of the focusing optical system are generated in accordance with outputs of the detection sections.

In this case, the detection result of the focus position deviation and the spherical aberration can be obtained in the form of electric signals.

The foregoing light beam separation means may be structured such that:

a first region and a second region are separated by a circle or an arc;

the first region is a region having a light axis of the light beam passing through the focusing optical system as its center, in which a region corresponding to virtually 70 percent of an effective radius of the light beam, which is determined by an aperture of an objective lens in the focusing optical system, makes up a substantial proportion;

the second region is a region outside the first region, apart from the center;

the first region guides the first light beam; and the second region guides the second light beam.

With this structure, a spherical aberration can be detected sensitively.

The foregoing light beam separation means may be a hologram. With this structure, the light beam separation means can be downsized.

An optical pick-up device of the present invention may be structured so as to include:

a light source;

a focusing optical system for focusing a light beam emitted from the light source onto a recording medium; and aberration detection means for detecting an aberration of the focusing optical system in accordance with at least one of focus positions of a first light beam and a second light beam, the first light beam in which a light beam passing through in proximity to a light axis as a center of a light beam reflected by the recording medium and passing through the focusing optical system makes up a substantial proportion, and the second light beam in which a light beam passing through an outside of an area in proximity to the light axis makes up a substantial proportion, and the optical pick-up device may be structured so as to further include:

spherical aberration correction means for correcting a spherical aberration of the focusing optical system in accordance with an aberration detected by the aberration detection means; and correction means for correcting a focus position deviation of the focusing optical system in accordance with a focus position deviation detected by the aberration detection means.

According to the foregoing structure, a spherical deviation can be optically detected.

The aberration detection means may be structured so as to include:

a first and a second focus error detection sections for detecting a focus position deviation of the first light beam and a focus position deviation of the second light beam independently; and light beam separation means for guiding the first and the second light beams to the first and the second focus error detection sections, respectively, from the light beam passing through the focusing optical system, wherein a spherical aberration error signal SAES and a focus error signal FES of the focusing optical system are generated in accordance with outputs of the detection sections.

In this case, the detection result of the focus position deviation and the spherical aberration can be obtained in the form of electric signals.

The foregoing light beam separation means may be structured such that:

a first region and a second region are separated by a circle or an arc;

the first region is a region having a light axis of the light beam passing through the focusing optical system as its center, in which a region corresponding to virtually 70 percent of an effective radius of the light beam, which is determined by an aperture of an objective lens in the focusing optical system, makes up a substantial proportion;

the second region is a region outside the first region, apart from the center;

the first region guides the first light beam; and the second region guides the second light beam.

With this structure, a spherical aberration can be detected sensitively.

The optical pick-up device of the present invention may be structured so as to further include:

focusing means for focusing the light beam on at least one information recording layer of a recording medium having a plurality of information recording layers, wherein a spherical aberration is corrected by the spherical aberration correction means, in accordance with an aberration detected by the aberration detection means.

According to the foregoing structure, even in a recording medium having a plurality of information recording layers, information can be appropriately recorded/reproduced on/from the respective information recording layers.

The foregoing light beam separation means may be structured so as to include:

a first region for separating the first light beam; and a second region for separating the second light beam, wherein the first region and the second region are separated by a boundary, and the boundary is a circle or an arc.

As mentioned above, a separation line separating the light beam is satisfactorily provided as long as it passes at an extreme value of a curve representing a wave front aberration, so a spherical aberration can be detected even when the separation line is provided in the form as, for example, an ellipse or a regular polygon passing through in proximity to the extreme value. However, in order to detect the spherical aberration most sensitively, it is necessary to separate the light beam accurately at the extreme value of the curve representing the wave front aberration (70 percent of the effective radius of the light beam). In order to meet this requirement, the separation line (boundary) is satisfactorily provided as long as it is a circle or an arc, which enables the spherical aberration to be detected most sensitively.

The foregoing light beam separation means may be structured so as to include:

a first region for separating the first light beam from a light beam; and a second region for separating the second light beam from the light beam, wherein the first region and the second region are separated by a separation line which at least partially has a straight section virtually parallel to a direction orthogonal to a track direction of the optical recording medium.

In this case, since the first region and the second region which separate the first light beam and the second light beam are separated by the separation line which at least partially has a straight section virtually parallel to the direction orthogonal to the track direction of the optical recording medium, the first region and the second region are formed so as to be extended in a radial direction. Thus, even if the center of the light beam is moved in the radial direction during tracking control, the light beam which is supposed to be directed to one region is not directed to another region.

Therefore, even if tracking control is performed, a spherical aberration can always be detected accurately and corrected.

The foregoing focus position deviation amount detection means may obtain the spherical aberration correction signal SAES by taking the focus error signal FES as almost zero.

In this case, in a condition that the focus error signal FES is almost zero, that is, in a condition that there is no focus position deviation, it is regarded that the position of the best image point of the focusing optical system coincides with the position of the optical recording medium. Therefore, in this condition, the spherical aberration error signal SAES can be correctly detected.

With this structure, in order to detect the spherical aberration most correctly, it is necessary to obtain the spherical aberration error signal SAES by taking the focus error signal FES as almost zero, as mentioned above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aberration detection device in which a light beam emitted from a light source is focused on an information recording layer of an optical recording medium through a dual lens objective lens constituted by a first lens element and a second lens element, and in which a light beam reflected from the information recording layer is incident on light beam separation means through the dual lens objective lens so as to separate the light beam into a first light beam, which includes a light axis of the light beam, and a second beam, which does not include the light axis of the light beam, and thereby detect a spherical aberration of the dual lens objective lens, said aberration detection device comprising:

spherical aberration detection means for detecting the spherical aberration in accordance with at least one of focus positions of the two light beams separated by said light beam separation means, said light beam separation means including a first region for separating the first light beam, and a second region for separating the second light beam, and said first and second regions are separated by a boundary, and said boundary is formed as a circle or an arc centered on the light axis of the light beam, having a radius virtually 70 percent of an effective radius of the light beam.

2. The aberration detection device of claim 1, wherein:

said light beam separation means is a hologram.

3. An aberration detection device in which a light beam emitted from a light source is focused on an information recording layer of an optical recording medium through a dual lens objective lens constituted by a first lens element and a second lens element, and in which a light beam reflected from the information recording layer is incident on light beam separation means through the dual lens objective lens so as to separate the light beam into a first light beam, which includes a light axis of the light beam, and a second beam, which does not include the light axis of the light beam, and thereby detect a spherical aberration of the dual lens objective lens, said aberration detection device comprising:

a first focus error detection section for outputting a first error signal, which is obtained by detecting a focus position deviation of the first light beam from the first light beam according to a beam size method for detecting a focus position deviation by utilizing changes in the beam size; and a second focus error detection section for outputting a second error signal, which is obtained by detecting a focus position deviation of the second light beam from the second light beam according to the beam size method, wherein a spherical aberration error signal SAES showing an amount of the spherical aberration of said dual lens objective lens is obtained from an equation:

$SAES = F1 - FES \times k1$ ($k1$: a coefficient), or $SAES = F2 - FES \times k2$ ($k2$: a coefficient), where F1 is the first error signal, F2 is the second error signal, and FES is F1+F2, the spherical aberration is detected by the spherical aberration error signal SAES, and the coefficients k1 and k2 are determined as long as the SAES changes little even if a focus position deviation occurs.

4. The aberration detection device of claim 3, wherein:

said light beam separation means includes a first region for separating the first light beam, and a second region for separating the second light beam; and said first and second regions are separated by a boundary, and said boundary is formed as a circle or an arc.

5. The aberration detection device of claim 4, wherein:
said boundary is formed as a circle or an arc centered on the light axis of the light beam, having a radius virtually 70 percent of an effective radius of the light beam.

6. The aberration detection device of claim 3, wherein:
said light beam separation means includes a first region for separating the first light beam from the light beam, and a second region for separating the second light beam from the light beam; and
said first region and said second region are separated by a separation line which at least partially includes a straight line virtually parallel to a direction orthogonal to a track direction of said optical recording medium.

7. The aberration detection device of claim 6, wherein:
the separation line includes an arc in addition to the straight line virtually parallel to a direction orthogonal to a track direction of said optical recording medium.

8. The aberration detection device of claim 6, wherein the separation line is a straight line.

9. The aberration detection device of claim 3, wherein said light beam separation means is a hologram.

10. An aberration detection method in which a light beam emitted from a light source is focused on an information recording layer of an optical recording medium through a dual lens objective lens constituted by a first lens element and a second lens element, and in which a light beam reflected from the information recording layer is incident on light beam separation means through the dual lens objective lens so as to separate the light beam into a first light beam, which includes a light axis of the light beam, and a second beam, which does not include the light axis of the light beam, and thereby detect a spherical aberration of the dual lens objective lens,
wherein said light beam separation means includes a first region for separating the first light beam, and a second region for separating the second light beam, and
wherein said first and second regions are separated by a boundary, and said boundary is formed as a circle or an arc centered on the light axis of the light beam, having a radius virtually 70 percent of an effective radius of the light beam,
said method comprising the step of detecting the spherical aberration in accordance with at least one of focus positions of the two light beams separated by the light beam separation means.

11. An optical pick-up device comprising:
a light source;
a focusing optical system for focusing a light beam emitted from said light source onto an optical recording medium;
light beam separation means for separating the light beam reflected from the optical recording medium and passed through the focusing optical system, into a first light beam, which includes a light axis of the light beam, and a second beam, which does not include the light axis of the light beam;
spherical aberration detection means for detecting the spherical aberration in accordance with at least one of focus positions of the two light beams separated by said light beam separation means; and
spherical aberration correction means for correcting the spherical aberration detected by said spherical aberration detection means,
said light beam separation means including a first region for separating the first light beam, and a second region for separating the second light beam, and
said first and second regions being separated by a boundary, and said boundary being formed as a circle or an arc centered on the light axis of the light beam, having a radius virtually 70 percent of an effective radius of the light beam.

12. The optical pick-up device of claim 11, wherein said light beam separation means is a hologram.

13. An optical pick-up device comprising:
a light source;
a focusing optical system for focusing a light beam emitted from said light source onto an optical recording medium;
light beam separation means for separating a light beam reflected from said optical recording medium and passing through said focusing optical system, into a first light beam, which includes a light axis of the light beam, and a second light beam, which does not include the light axis of the light beam;
focus position deviation amount detection means for detecting a deviation amount of at least one of focus positions of the first light beam and the second light beam separated by said light beam separation means; and
correction means for correcting a spherical aberration of said focusing optical system in accordance with the deviation amount of the focus position detected by said focus position deviation amount detection means,
said focus position deviation amount detection means including:
a first focus error detection section for detecting a focus position deviation of the first light beam from the first light beam, and outputting a first error signal; and
a second focus error detection section for detecting a focus position deviation of the second light beam from the second light beam, and outputting a second error signal,
wherein a spherical aberration error signal SAES showing an amount of the spherical aberration of said focusing optical system is obtained from an equation:

$SAES=F1-FES \times k1$ ($k1$: a coefficient), or $SAES=F2-FES \times k2$ ($k2$: a coefficient), where F1 is the first error signal, F2 is the second error signal, which is a focus error signal showing an amount of a focus error of said focusing optical system, is F1+F2, and the coefficients k1 and k2 are determined as long as the SAES changes little even if a focus position deviation occurs, and
said correction means corrects the spherical aberration in accordance with the spherical aberration error signal SAES obtained by said focus position deviation amount detection means.

14. The optical pick-up device of claim 13, wherein:
said light beam separation means includes a first region for separating the first light beam, and a second region for separating the second light beam; and
said first and second regions are separated by a boundary, and said boundary is formed as a circle or an arc.

15. The optical pick-up device of claim 14, wherein:
said boundary is formed as a circle or an arc centered on the light axis of the light beam, having a radius virtually 70 percent of an effective radius of the light beam.

16. The optical pick-up device of claim 13, wherein:
said light beam separation means includes a first region for separating the first light beam from the light beam, and a second region for separating the second light beam from the light beam; and said first region and said second region are separated by a separation line which at least partially includes a straight line virtually parallel to a direction orthogonal to a track direction of said optical recording medium.

17. The optical pick-up device of claim 16, wherein:
the separation line includes an arc in addition to the straight line virtually parallel to a direction orthogonal to a track direction of said optical recording medium.

18. The optical pick-up device of claim 16, wherein the separation line is a straight line.

19. The optical pick-up device of claim 13, wherein:
focus position deviation amount detection means obtains the spherical aberration error signal SAES, taking the focusing error signal FES as zero.

* * * * *